(12) United States Patent
Briody et al.

(10) Patent No.: US 12,197,867 B2
(45) Date of Patent: Jan. 14, 2025

(54) ENTITY TYPE IDENTIFICATION FOR NAMED ENTITY RECOGNITION SYSTEMS

(71) Applicant: BENEVOLENTAI TECHNOLOGY LIMITED, London (GB)

(72) Inventors: Joss Briody, Brooklyn, NY (US); Juha Iso-Sipila, London (GB); Oliver Oechsle, London (GB); Theodosia Togia, London (GB)

(73) Assignee: BenevolentAI Technology Limited, London (GB)

( * ) Notice: Subject to any disclaimer, the term of this patent is extended or adjusted under 35 U.S.C. 154(b) by 235 days.

(21) Appl. No.: 17/426,764

(22) PCT Filed: Mar. 23, 2020

(86) PCT No.: PCT/GB2020/050777
§ 371 (c)(1),
(2) Date: Jul. 29, 2021

(87) PCT Pub. No.: WO2020/193964
PCT Pub. Date: Oct. 1, 2020

(65) Prior Publication Data
US 2022/0188519 A1    Jun. 16, 2022

(30) Foreign Application Priority Data
Mar. 26, 2019   (GB) ..................................... 1904161

(51) Int. Cl.
*G06F 40/295*    (2020.01)
*G06N 3/08*    (2023.01)

(52) U.S. Cl.
CPC ............. *G06F 40/295* (2020.01); *G06N 3/08* (2013.01)

(58) Field of Classification Search
CPC ................................ G06F 40/295; G06N 3/08
See application file for complete search history.

(56) References Cited

U.S. PATENT DOCUMENTS

2011/0264651 A1* 10/2011 Selvaraj .............. G06F 16/9532
707/723
2018/0189265 A1* 7/2018 Chen ...................... G06F 17/18
(Continued)

OTHER PUBLICATIONS

Liu Jin et al., "Fine-grained entity type classification with adaptive context", Soft Computing, Springer Verlag, Berlin, DE., vol. 22, No. 13, pp. 4307-4318, dated Jan. 25, 2018.
(Continued)

*Primary Examiner* — Pierre Louis Desir
*Assistant Examiner* — Daniel W Chung
(74) *Attorney, Agent, or Firm* — Smith Baluch LLP

(57) ABSTRACT

Method(s), apparatus and system(s) are provided for entity type identification and/or disambiguation of entities within a corpus of text the method including: receiving one or more entity results, each entity result comprising data representative of an identified entity and a location of the identified entity within the corpus of text; identifying an entity type for each entity of the received entity results by inputting text associated with the location of said each entity in the corpus of text to a trained entity type (ET) model configured for predicting or extracting an entity type of said each entity from the corpus of text; and outputting data representative of the identified entity type of each entity in the received entity results.

25 Claims, 11 Drawing Sheets

(56) References Cited

U.S. PATENT DOCUMENTS

| | | | |
|---|---|---|---|
| 2019/0130282 A1* | 5/2019 | Quirk | G06N 3/08 |
| 2019/0156212 A1* | 5/2019 | Bottaro | G06F 16/951 |
| 2020/0117856 A1* | 4/2020 | Kumar Karn | G06F 40/30 |

OTHER PUBLICATIONS

PCT Written Opinion and Search Report issued in related PCT/GB2020/050777 mailed on Jul. 2, 2020.

PCT Preliminary Report on Patentability issued in connection with related PCT/GB2020/050777 mailed Oct. 7, 2021.

* cited by examiner

ENTITY TYPE IDENTIFICATION FOR NAMED ENTITY RECOGNITION SYSTEMS

CROSS-REFERENCE TO RELATED PATENT APPLICATIONS

This patent application is the 35 U.S.C. 371 national stage of International Patent Application PCT/GB2020/050777 filed 23 Mar. 2020, which claims the benefit of priority to GB Application 1904161.5 filed 26 Mar. 2019, which is incorporated by reference herein for all purposes.

The present application relates to a system and method for performing entity type identification for named entity recognition systems when identifying entities from large scale datasets such as a corpus of text.

BACKGROUND

Entity recognition within large scale datasets such as a corpus of data or text in one or more fields such as, by way of example only but not limited to, bioinformatic or chem(o)informatic literature (e.g. publications stored by various sources such as, by way of example only but is not limited to, PubMed), is important for identifying entity types, entities of interest, and/or the corresponding entity relationships there between. The large scale dataset or corpus of data/text may comprise or represent any information or data from one or more data source(s), content source(s), content provider(s) and the like and may include, by way of example only but is not limited to, unstructured data/text, structured data/text, a body of text, articles, publications, literature, documents, text, email, images and/or videos, or any other information or data that may contain a wealth of information. This data may be compiled from, generated by and/or stored with/or by one or more sources, content sources/providers, or a plurality of sources (e.g. PubMed, MEDLINE, Wikipedia) and which may be used to form a large scale dataset or corpus of data/text from which entities, entity types and relationships of interest may be extracted. Such large scale datasets or corpus of data/text may include data or information from one or more data sources, where each data source may provide data representative of a plurality of unstructured and/or structured text/documents, documents, articles or literature and the like. Although most documents, articles or literature from publishers, content providers/sources have a particular document format/structure, for example, PubMed documents are stored as XML with information about authors, journal, publication date and the sections and paragraphs in the document, such documents are considered to be part of the corpus of data/text. For simplicity, the large scale dataset or corpus of data/text is referred to herein, by way of example only but is not limited to, a corpus of text.

Conventional named entity recognition (NER) systems may be used to identify and extract entities, entity types, and/or the positions where the entities/entity types occur within a corpus of text. These NER systems use entity dictionaries that are manually curated from the plurality of sources of a corpus of text. Each entity dictionary may store a plurality of entity names of a particular entity type and are used with text matching techniques to identify and extract the names and types of "entities" from the corpus of text or literature. For Instance in a bioinformatics context, the entity named leukaemia"of the type disease" may be Identified from a body of text within a corpus of text containing, by way of example only but is not limited to, PubMed/MEDLINE/Wikipedia publications associated with "leukaemia". In order for these NER systems to operate, the entity dictionaries need to be continually manually updated, curated and annotated in order to reliably match and identify known entities within portions of the corpus of text. As the body of literature or scientific research and hence the corpus of text increases, such NER systems are seldom up-to-date as they are not capable of adapting to the most recent new, created or discovered entities; or incapable of recognising or adapting to any non-standardised or alternative use of current entity terminology and/or entity types. This leads to incorrect or ambiguous entity results that are detrimental to downstream processes relying on NER.

Moreover, NER systems that typically use curated entity dictionaries of entity types to achieve identification and extraction of entities from a corpus of text, typically do so context-free and heavily rely on correct curation and updates to entity dictionaries. However, entity results may contain ambiguities when entities of differing types have the same name across different documents. This means that such NER systems may incorrectly identify a character string with a particular entity and entity type when the portion of text containing the character string is actually referring to the same named entity of a different entity type or sub-type. Alternatively, such NER systems may default to a particular entity type when an ambiguity occurs in the hope that the most popular use of an entity of a particular entity type is correct. Thus, entity results provided by dictionary based NER systems in which an identified entity may have more than one entity type may select the incorrect entity type for the identified entity. For example, the chemical element silver may be abbreviated as, "Ag", which may be defined as an entity of the chemical type, whereas the protein pathway antigen may be abbreviated, "Ag", which may be defined as an entity of the protein type. Thus, a classical/conventional NER system may incorrectly identify a character string "Ag" in a portion of text as silver, an entity of the chemical type, whereas this character string "Ag" may in fact be associated with Antigen, an entity of the protein type.

Although NER systems based on machine learning (ML) techniques may take into account the context of entities, these systems are dependent on the correct identification of entities and entity types for generating extensive training datasets to enable the ML techniques to generate reliable or robust NER models for identifying entities and/or entity types. Again, generating extensive training datasets typically relies on dictionary-based NER systems and manual curation and annotation. Even though this may result in fast generation of training datasets, using such NER dictionary based systems with manual curation means the training datasets being generated and NER models created are already out-of-date. This increases the risk that the NER models are incapable of adapting or correctly recognising the context of and identifying newly created or discovered entities and/or entity types; and/or incapable of recognising the context of or adapting to any non-standardised or alternative use of current entity terminology and/or entity types and the like. This further leads to incorrect or ambiguous entity results, which are detrimental to downstream processes relying on NER.

Furthermore, even though NER systems using machine learning (ML) techniques are thought to take into account the context of entities within documents by using training datasets that Include text surrounding Instances of each known entity's name to provide an improved classification of entities and/or entity types, such specificity often leads to overfitting of learned entities and entity types and a biased NER ML-based model. That is, an NER ML-based system learns the most popular entity type that is most common for a given entity name and typically biases its prediction towards this entity type. Given the entity results may be fed back as further training data for updating the NER ML-based systems, this can further amplify the overfitting of one or more NER models and cause generation of inaccurate and/or biased entity identification results since the system may not correctly learn to be able to adapt to the context of the text surrounding an entity it encounters from an updated corpus of text. Rather, such systems end up offering predictions more akin to simple probabilistic estimations or dictionary-based NER systems.

There is a desire for more efficient and robust entity and entity type identification and/or disambiguation system for use by ML-based NER systems that have the capability of avoiding the above-mentioned overfitting scenario to biases in predicting and/or identifying entity and entity types from a corpus of text. Such a system may consequently provide more accurate entity/entity type prediction results.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides an entity type (ET) identification or disambiguation system based on machine learning (ML) techniques that can minimise or avoid overfitting of named entity recognition (NER) systems using ML based techniques whilst enhancing the accuracy of entity and/or entity type identification produced therefrom. Coupling a NER system with an ET identification/disambiguation system, in which an NER system output a set of entity results for further processing by the ET identification/disambiguation system using an ET identification model. The ET identification model is configured to predict and identify the most likely entity type associated with one or more of the entities in the received set of entity results using the relevant portions of text from the corpus of text associated with the entity results.

For example, a ML technique process is used to generate an ET model (ET identification model or ET model) that is configured to complement the NER system being used on a corpus of text. The ML technique is trained to generate an ET model that recognises the kind of text occurring before and after an entity, e.g. an entity's name or character string, within a portion of text (e.g. a document) and provides the most likely entity type of a plurality of different entity types associated with that entity. In this way, the ET model is configured to contextualise occurrences of entity names and can better predict the entity type for each of the entities. This information may be further used by the NER system to assist in more accurately predicting the entity type for the entities identified within a corpus of text.

In a first aspect, the present disclosure provides a computer-implemented method for entity type identification of entities within a corpus of text, the method including: receiving one or more entity results, each entity result comprising data representative of an identified entity and a location of the identified entity within the corpus of text; identifying an entity type for each entity of the received entity results by inputting text associated with the location of said each entity in the corpus of text to a trained entity type (ET) model configured for predicting or extracting an entity type of said each entity from the corpus of text; and outputting data representative of the identified entity type of each entity in the received entity results.

Preferably, wherein inputting text associated with the location of said each entity further comprises inputting text before and after the location of said each entity in the corpus of text.

Preferably, wherein receiving the one or more entity results further comprises receiving the one or more entity results generated by a named entity recognition (NER) system.

Preferably, wherein each entity result comprising data representative of an identified entity and a location of the identified entity within the corpus of text includes one or more of the group of: an identified entity and an indication of the location of the identified entity within the corpus of text; an identified entity and portions of text from the corpus of text surrounding the identified entity; an identified entity, a first portion of text before the location of the identified entity, and a second portion of text after the location of the identified entity; a portion of text surrounding the location of an identified entity; and a first portion of text before the location of an identified entity and a second portion of text after the location of an identified entity.

Preferably, the computer-implemented method further comprising: receiving one or more entity results from an NER system, wherein each entity result includes data representative of an a first portion of text before the location of an identified entity, and a second portion of text after the location of the identified entity within the corpus of text; identifying an entity type for each entity of the received entity results by inputting the first and second portions of text associated with the identified entity in the corpus of text to the trained entity type, ET, model configured for predicting or extracting an entity type of said each entity from the corpus of text; and sending data representative of the identified entity type of each entity in the received entity results to the NER system.

Preferably, the computer-implemented method further comprising: receiving one or more entity results from an NER system, wherein each entity result includes data representative of an identified entity, an identified entity type and a location of the identified entity within the corpus of text; identifying ambiguous entity types between multiple entity results associated with related portions of text when said multiple entity results represent the same entity in which at least one of the multiple entity results has a different entity type as the other of the multiple entity results; inputting, for each of the multiple entity results, text associated with the location of said each entity in the corpus of text to the trained ET model configured for predicting or extracting an entity type of said each entity from the corpus of text; and aggregating the predicted or extracted entity types of the multiple entity results associated with the related portions of text for outputting an entity type representative of the multiple entity results.

Preferably, wherein the related portions of text are located in a document from the corpus of text, and aggregating the predicted or extracted entity types of the multiple entity results for the document comprises aggregating the predictions for each entity of the multiple entity results to form an overall prediction for the entity type of the entities of the multiple entity results.

Preferably, the computer-implemented method further comprising generating or updating the ET model by training a machine learning, ML, technique for predicting or extracting entity types from the corpus of text based on the one or more entity results.

Preferably, wherein the ML technique comprises at least one ML technique from the group of: a neural network; a recurrent neural network; a feed-forward neural network; a convolutional neural network; a long short-term memory (LSTM) neural network; a bi-directional LSTM neural network; a neural network based on LSTM conditional random field (CRF); and any other ML technique for predicting entity types from a corpus of text based on the one or more entity results.

Preferably, the computer-implemented method further comprising updating the ET model based on the identified entity types.

Preferably, the computer-implemented method further comprising training the ML technique to generate or update the ET model based on a labelled dataset, the labelled dataset comprising a plurality of labelled data items, in which each labelled data item comprises a portion of text from the corpus of text associated with an entity and annotated with an entity type label.

Preferably, wherein the portion of text from the corpus of text associated with an entity includes a first portion of text, a second portion of text representing the entity, and a third portion of text after the entity.

Preferably, wherein each labelled data item comprises the first and third portions of text surrounding the second portion of text representing the entity.

Preferably, wherein training the ML technique to generate or update the ET model further comprises iteratively training the ML technique to generate or update the ET model based on the labelled dataset, by, for each iteration: comparing the labelled data items and the corresponding predicted or extracted entity types output from the ET model; updating the ET model based on the comparisons based on a loss function associated with the ML technique.

Preferably, wherein the ET model is based on a neural network comprising forward and backward hidden states configured for representing a first portion of text before the location of the entity and a second portion of text after the location of the entity, respectively, wherein the forward and backward hidden states are concatenated together for generating an entity type representation of the first and second portions of text.

Preferably, the ET model further comprising a first portion of the ET model and a second portion of the ET model, the first and second portions of the ET model configured to predict or extract data representative of entity types from the corpus of text based on the one or more entity results, the method further comprising: splitting a portion of text associated with an entity of an entity result into a first portion of text before the location of said entity, and a second portion of text after the location of said entity; inputting the first portion of text to the first portion of the ET model for predicting data representative of a first entity type estimate; inputting the second portion of text to the second portion of the ET model for predicting data representative of a second entity type estimate; and combining data representative of the first and second entity type estimates to form an identified entity type associated with said entity.

Preferably, wherein the data representative of the first entity type estimate comprises a first N-dimensional vector, and the data representative of the second entity type estimate comprises a second N-dimensional vector, wherein combining data representative of the first and second entity types further comprises concatenating the first and second N-dimensional vectors and reducing the dimensionality of the resulting vector to the number of possible entity types, wherein each vector element of the resulting vector corresponds to a different entity type, the value of each vector element representing the likelihood of the entity being that particular entity type.

Preferably, wherein the ET model is generated from a ML technique based on a bi-directional LSTM neural network.

Preferably, wherein model parameters for the ET model are jointly trained based on a plurality of labelled data items, each labelled data item comprising data representative of a first portion of text before the location of an entity, a second portion of text after the location of the entity, and annotated with an entity type label associated with the entity.

In a second aspect, the present disclosure provides a machine learning (ML) model obtained from the computer-implemented method according to the first aspect, combinations and/or modifications thereof, as claimed herein, and/or as described herein.

In a third aspect, the present disclosure provides an apparatus comprising: a receiver configured for receiving one or more entity results, each entity result comprising data representative of an entity and a location of the identified entity within a corpus of text; an entity type identification module comprising an entity type model configured for predicting or extracting an entity type for each of the one or more entity(ies) of the received entity results based on text associated with the identified entity in the corpus of text; and transmitter for outputting data representative of the predicted or identified entity type for each entity of the received entity results.

Preferably, wherein the entity type model is configured for receiving text associated with the location of said each entity, wherein the text associated with the location of said each entity comprises a portion of text before the location of said each entity and a portion of text after the location of said each entity in the corpus of text.

Preferably, wherein the apparatus is further configured to implement the computer-implemented method according to the first aspect, combinations and/or modifications thereof, as claimed herein, and/or as described herein.

In a fourth aspect, the present disclosure provides an apparatus comprising a processor, a memory unit and a communication interface, wherein the processor is connected to the memory unit and the communication interface, wherein the processor and memory are configured to implement the computer-implemented methods according to the first aspect, combinations and/or modifications thereof, as claimed herein, and/or as described herein.

In a fifth aspect, the present disclosure provides a system comprising: an named entity recognition, NER, system for generating entity results from a corpus of text, each entity result comprising data representative of an identified entity and the location of the identified entity within the corpus of text; and an apparatus according to any of the third aspect or fourth aspect, combinations and/or modifications thereof, as claimed herein, and/or as described herein, the apparatus coupled to the NER system, the apparatus configured for receiving one or more entity results from the NER system.

In a sixth aspect, the present disclosure provides a computer-readable medium comprising data or instruction code, which when executed on a processor, causes the processor to implement the computer-implemented method according to the first aspect, combinations and/or modifications thereof, as claimed herein, and/or as described herein.

In a seventh aspect, the present disclosure provides a tangible computer-readable medium comprising data or instruction code, which when executed on a processor, causes the processor to implement the computer-implemented method according to the first aspect, combinations and/or modifications thereof, as claimed herein, and/or as described herein.

In an eighth aspect, the present disclosure provides an ET model obtained from the computer-implemented method according to the first aspect, combinations and/or modifications thereof, as claimed herein, and/or as described herein.

Preferably, the computer-implemented methods, apparatus, system, or computer-readable medium according to any of the first, second, third, fourth, fifth, sixth, seventh and/or eighth aspects, combinations and/or modifications thereof, as claimed herein, and/or as described herein, wherein an entity comprises entity data associated with an entity type from the group of: gene; disease; compound/drug; protein; chemical, organ, biological; or any other entity type associated with bioinformatics or chem(o)informatics and the like.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It Is also Intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example only, with reference to the following drawings, in which.

Figure 1A:
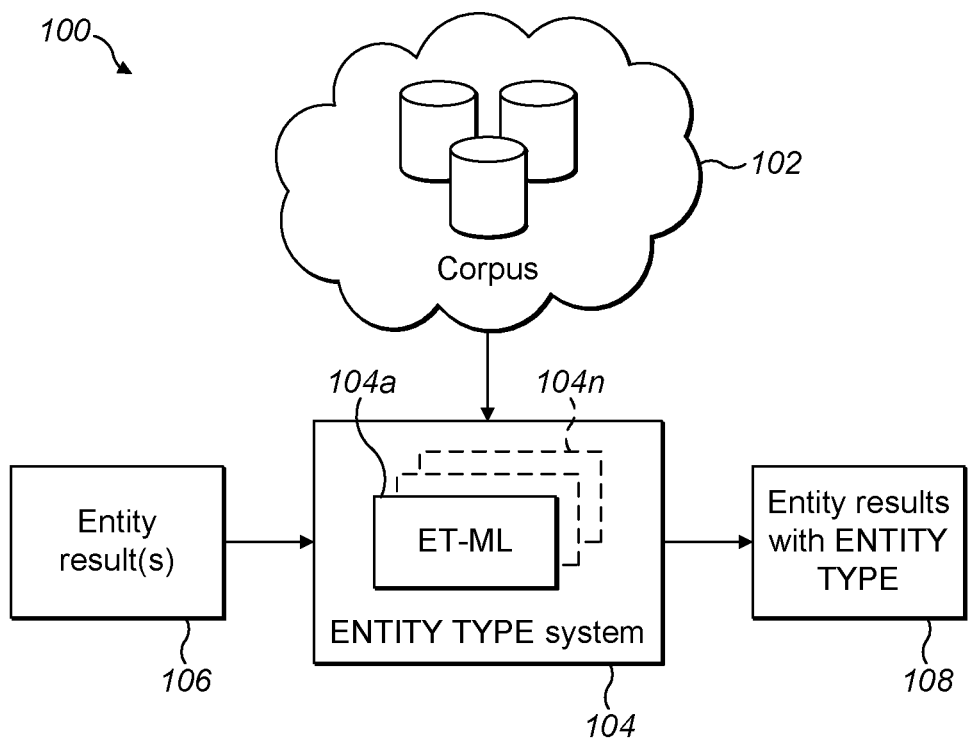
FIG. 1a is a schematic diagram illustrating an example entity type identification system according to the invention.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Entity recognition within data or text such as bioinformatic or chem(o)informatic literature is important for identifying and extracting entities of interest and/or entity types of interest, the corresponding entities and the relationships between them and the like. The entity recognition information may be used in subsequent downstream process(es) such as relationship extraction, generating bioinformatic and/or chem(o)informatic models using machine learning techniques from labelled training data generated based on the identified entities, entity types, and relationships between entities and the like.

Researchers and scientists are constantly adding to the body of human knowledge in many areas and fields of science (e.g. bioinformatics and/or chem(o)informatics) in which the body of research forms an exponentially increasing large amount of a corpus of text/documents (or a large scale dataset) such as, by way of example only but not limited to, structured/unstructured text, documents, articles, publications, research related text and/or documents; conference and journal papers; published patents/patent applications; news articles; whitepapers; websites/blog posts; and/or any other source of useful information and the like. Given the overwhelming size of the bioinformatics and/or chem(o)informatics literature, named entity recognition (NER) systems are typically used for text-mining and the like for identifying and extracting identified entities, entity types, and/or the positions where the entities and/or entity types occur within the text. These NER systems typically use entity dictionaries that are manually annotated in order to identify entities within text. In the medical sciences such as bioinformatics and/or chem(o)informatics, the entity types can be of a range of types such as genes, diseases, chemicals, proteins, cell-lines, etc. and the amount of unstructured data, text and/or literature and the like being generated and hence the number of entities and/or entity types is constantly increasing as further research in these fields is conducted. Given this, there is an increasing number of entities that may have the same name or character string but which belong to several different entity types. This leads to ambiguity in identifying entities and/or entity types from the ever increasing corpus of text/data.

Although some NER systems using ML techniques may take into account the context of entities within portions of text/documents by examining the text surrounding instances of each entity's name to provide an Improved classification of entities, this may lead to overfitting of learned entity types in which an ML based-NER system learns which entity type is most common for a given entity name and biases its prediction towards this type. Given the results may be fed back into the ML-based NER system, this can cause generation of inaccurate entity identification results since the system may not correctly learn the context of the text surrounding an entity. Rather, such systems end up offering predictions more akin to simple probabilistic estimations.

The invention provides a solution to the above-mentioned key issues by providing a more robust entity type (ET) identification or disambiguation system based on ML techniques that can minimise or avoid overfitting of the NER systems using ML based techniques whilst enhancing the accuracy of entity and/or entity type identification produced therefrom. The invention is directed to overcoming these key issues by a judicious combination or coupling of an NER system with an ET identification/disambiguation system, in which an NER system output a set of entity results for further processing by the ET identification/disambiguation system using an ET identification model. The ET identification model is configured to predict and identify the most likely entity type associated with one or more of the entities in the received set of entity results using the relevant portions of text from the corpus of text associated with the entity results.

In particular, a ML technique process is used to generate an ET model (ET identification model or ET model) that is configured to complement an NER system being used on a corpus of text. The ML technique is trained to generate an ET model that recognises the kind of text occurring before and after an entity, e.g. an entity's name or character string, within a portion of text (e.g. a document) and provides the most likely entity type of a plurality of different entity types associated with that entity. In this way, the ET model is configured to contextualise occurrences of entity names and can better predict the entity type for each of the entities. This information may be further used by the NER system to assist in more accurately predicting the entity type for the entities identified within a corpus of text.

The ET model or ET identification model is trained and generated from one or more ML technique(s) using a labelled training dataset including a plurality of labelled training data elements, where each labelled training data element is associated with an entity of a plurality of entities, and includes data representative of a text portion associated with the entity and annotated with an entity type label associated with the entity. For each labelled training data element associated with an entity, the text portion includes text or characters surrounding the character string associated with the entity.

For example, the text portion annotated with an entity type label may include: a) text or characters prior to the text or character string associated with the entity; and b) text or characters after the text or character string associated with the entity; but does not include the text or character string associated with the entity. In another example, the text portion including a named entity and annotated with an entity type label may include the surrounding text of the named entity, where the surrounding text is split into text occurring to the "left" and to the "right" of the named entity, where the ML technique or system is applied to the result. The surrounding text of the text portion may not include the entity name or character string of the named entity such that the named entity is not considered by the ML technique or system during training. It has been found that omitting the text or character string associated with the entity (or named entity) in each training data element further minimises or avoids the ML technique generating an overfitted entity type identification model, which further reduces bias in the entity type identification model. It has been found that this increases the accuracy of predicting the correct entity type for entities from a corpus of text input to the resulting ET identification model.

ML technique(s) are used to train and generate one or more trained models or classifiers having the same or a similar output objective associated with input data. ML technique(s) may comprise or represent one or more or a combination of computational methods that can be used to generate analytical models, classifiers and/or algorithms that lend themselves to solving complex problems such as, by way of example only but is not limited to, efficient and accurate large scale data mining including text-mining, prediction, analysis and extraction of entities and/or entity types and relationships of entities from a large scale datasets (e.g. a corpus or set of text/documents or unstructured data) for generating a large scale labelled training datasets for use in ML techniques for generating further trained models for downstream processes. The downstream processes may include, by way of example only but not limited to, trained models or classifiers and/or analytical models in relation to complex processes and/or compounds; classification of input data in relation to one or more relationships. With correctly annotated training datasets in the chem(o)informatics and/or bioinformatics fields, ML techniques can be used to generate further trained models, classifiers, and/or analytical models for use in downstream processes such as, by way of example but not limited to, drug discovery, identification, and optimization and other related biomedical products, treatment, analysis and/or modelling in the informatics, chem(o)informatics and/or bioinformatics fields.

Examples of ML technique(s) that may be used by the invention as described herein may include or be based on, by way of example only but is not limited to, any ML technique or algorithm/method that can be trained on a labelled and/or unlabelled datasets to generate a model or classifier associated with the labelled and/or unlabelled dataset, one or more supervised ML techniques, semi-supervised ML techniques, unsupervised ML techniques, linear and/or non-linear ML techniques, ML techniques associated with classification, ML techniques associated with regression and the like and/or combinations thereof. Some examples of ML techniques may include or be based on, by way of example only but is not limited to, one or more of active learning, multitask learning, transfer learning, neural message parsing, one-shot learning, dimensionality reduction, decision tree learning, association rule learning, similarity learning, data mining algorithms/methods, artificial neural networks (NNs), deep NNs, deep learning, deep learning ANNs, inductive logic programming, support vector machines (SVMs), sparse dictionary learning, clustering, Bayesian networks, reinforcement learning, representation learning, similarity and metric learning, sparse dictionary learning, genetic algorithms, rule-based machine learning, learning classifier systems, and/or one or more combinations thereof and the like.

Some examples of supervised ML techniques may include or be based on, by way of example only but is not limited to, ANNs, DNNs, association rule learning algorithms, a priori algorithm, Éclat algorithm, case-based reasoning, Gaussian process regression, gene expression programming, group method of data handling (GMDH), inductive logic programming, instance-based learning, lazy learning, learning automata, learning vector quantization, logistic model tree, minimum message length (decision trees, decision graphs, etc.), nearest neighbour algorithm, analogical modelling, probably approximately correct learning (PAC) learning, ripple down rules, a knowledge acquisition methodology, symbolic machine learning algorithms, support vector machines, random forests, ensembles of classifiers, bootstrap aggregating (BAGGING), boosting (meta-algorithm), ordinal classification, information fuzzy networks (IFN), conditional random field, anova, quadratic classifiers, k-nearest neighbour, boosting, sprint, Bayesian networks, Naïve Bayes, hidden Markov models (HMMs), hierarchical hidden Markov model (HHMM), and any other ML technique or ML task capable of inferring a function or generating a model from labelled training data and the like.

Some examples of unsupervised ML techniques may include or be based on, by way of example only but is not limited to, expectation-maximization (EM) algorithm, vector quantization, generative topographic map, information bottleneck (IB) method and any other ML technique or ML task capable of inferring a function to describe hidden structure and/or generate a model from unlabelled data and/or by ignoring labels in labelled training datasets and the like. Some examples of semi-supervised ML techniques may include or be based on, by way of example only but is not limited to, one or more of active learning, generative models, low-density separation, graph-based methods, co-training, transduction or any other a ML technique, task, or class of supervised ML technique capable of making use of unlabeled datasets and labelled datasets for training (e.g. typically the training dataset may include a small amount of labelled training data combined with a large amount of unlabeled data and the like.

Some examples of artificial NN (ANN) ML techniques may include or be based on, by way of example only but is not limited to, one or more of artificial NNs, feedforward NNs, recurrent NNs (RNNs), Convolutional NNs (CNNs), autoencoder, long short-term memory (LSTM), LSTM-conditional random fields (CRF), Bi-directional LSTM, Bi-directional LSTM-CRF; recursive artificial NNs, extreme learning machines, logic learning machines, self-organizing maps, and other ANN ML technique or connectionist system/computing systems inspired by the biological neural networks that constitute animal brains and capable of learning or generating a model based on labelled and/or unlabelled datasets. Some examples of deep learning ML technique may include or be based on, by way of example only but is not limited to, one or more of deep belief networks, deep Boltzmann machines, DNNs, deep CNNs, deep RNNs, hierarchical temporal memory, deep Boltzmann machine (DBM), stacked Auto-Encoders, and/or any other ML technique capable of learning or generating a model based on learning data representations from labelled and/or unlabelled datasets.

For simplicity and by way of example only, the present invention may be described using ML techniques (aka Deep learning techniques) capable of learning from labelled training datasets and may be based on any ML technique or algorithm from the group of: a neural network; a recurrent neural network; a feed-forward neural network; a convolutional neural network; a long short-term memory (LSTM) neural network; a bi-directional neural network; a bi-directional LSTM neural network; a neural network combined with conditional random fields (CRF); a neural network based on LSTM CRF; or combinations thereof; and/or any other ML technique suitable for training an ET model or ET ML model for predicting, identifying, and/or classifying entity types of one or more entities and corresponding text portions of a corpus of text/documents and the like. Once trained, the trained ET model is configured for predicting, identifying, and/or classifying entity types of matched entities within one or more text portions associated with the matched entities.

FIG. 1a is a schematic diagram illustrating an example entity type identification system 100 according to the invention. The ET identification system 100 includes a large scale dataset such as a corpus of text 102 coupled to an ET identification apparatus 104, an entity result(s) module 106 coupled to the ET identification apparatus 104, and an ET identification result(s) module 108 coupled to the ET identification apparatus 104.

The large scale dataset or corpus of text 102 may include one or more data sources, where each data source may include data representative of a plurality of unstructured and/or structured text/documents and the like. In this example, the dataset 102 may be referred to as a corpus of text/documents 102, and preferably may include unstructured text or documents. For example, the corpus of text/documents 102 may include datasets from one or more data sources such as, by way of example only but is not limited to, PubMed publications, MEDLINE publications, any journal or article publication in the field of bioinformatics and/or chem(o)informatics. Although examples provided herein include a corpus of text/documents in the field of bioinformatics and/or chem(o)informatics, this is by way of example only and the invention is not so limited, it is to be appreciated by the skilled person that the corpus of text/documents may include any data representative of text/documents in any field of study or science, which may be used by text-mining or data-mining techniques for entity and entity type identification from the corpus of text/documents and the like.

The entity result(s) module 106 may be either: a) a portion of a named entity recognition (NER) system or other data processing system that receives a set of entity results in relation to identified entities within a corpus of text/documents and the like; or b) a portion of the ET identification apparatus configured for receiving a set of entity results in relation to identified entities from an NER system or other data processing system. In any event, the entity result(s) module 106 receives one or more entity result(s), each entity result including data representative of an identified entity and an indication of a location of the identified entity within a corpus of text/documents (e.g. a corpus of text or data). These may have been identified by, for example, an NER system.

For example, the set of entity results may include data representative of one or more identified entities, one or more entity types associated with each identified entity, and a portion of text and/or an indication of the location of the entity in a portion of text within the corpus of text/documents. The indication of the location of the entity in the portion of text within the corpus of text/documents may be used to enable the ET identification apparatus to locate, for each entity result, the portion of text surrounding the entity from the corpus of text/documents 102.

The ET identification apparatus may include one or more ET identification model(s) 104*a* or ET models configured for predicting and/or identifying an entity type for each entity of the received entity result(s) using the corpus of text/documents 102. For example, a portion of text associated with the location of said each entity in the corpus of text may be input to the ET model configured for predicting or extracting an entity type of said each entity from the corpus of text. Prior to using the ET model for predicting an entity type for each entity result, the ET model trained and configured for predicting or extracting an entity type of said each entity of the entity results from the relevant portion of text in the corpus of text/documents and the like. The ET identification apparatus 106 may output data representative of the identified entity type of each entity in the received entity results. The entity identification results module 108 may be configured to update the entity results to include data representative of the predicted or identified entity type for each entity in the received entity results. The entity identification results module 108 may be part of the ET identification apparatus 104.

During training of the ET model(s) 104*a*, the ET apparatus 104 may be configured, for each identified entity of the entity results, to retrieve and input text associated with the location of said each identified entity, the input text includes portions of text from the corpus of text surrounding the entity, e.g. before and after the location of said each identified entity, in the corpus of text. Each entity result may be structured to include data representative of the entity and either data representative of a portion of text associated with the identified entity within the corpus of text. For example, each entity result may include data representative of an identified entity and data representative of the portion of text associated with the identified entity based on at least one or more of the group of: an identified entity and an indication of the location of the identified entity within the corpus of text/unstructured text and the like; an identified entity and portions of text from the corpus of text/unstructured text and the like surrounding the identified entity; an identified entity, a first portion of text before the location of the identified entity, and a second portion of text after the location of the identified entity; a portion of text surrounding the location of an identified entity; and a first portion of text before the location of an identified entity and a second portion of text after the location of an identified entity; or a portion of text containing the identified entity; and/or any other suitable data representative of the identified entity and the portion of text surrounding the identified entity. The entity result may include data representative of the location of the identified entity within a portion of text of the corpus of text, or may include data representative of a portion of text containing said identified entity and the location of the identified entity within the portion of text.

The ET apparatus 104 may be configured for training, generating or updating one or more of the ET model(s) 104*a*-104*n* by training a corresponding ML technique for predicting or extracting entity types from the corpus of text based on the one or more entity results. In order to train an ML technique to generate or update the ET model, a labelled training dataset including a plurality of labelled data items may be used. Each labelled data item may include data representative of a portion of text from the corpus of text associated with a known or previously identified entity and annotated with an entity type label. Each entity type label may be from a set of entity type labels associated with one or more entity types. The entity type label may include data representative or identifying a particular entity type. As an example, the portion of text associated with a known entity from the corpus of text may include a first portion of text prior to a second portion of text representing the entity and a third portion of text after the entity. That is, each labelled data item includes the first and third portions of text surrounding the second portion of text representing the entity. Training the ML technique to generate or update the ET model may include iteratively training the ML technique to generate or update the ET model based on the labelled dataset, in which the first and third portions of text of each labelled data item are input and processed by the ML technique, where for each iteration: the entity type labels associated with the labelled data items are compared with the corresponding predicted or extracted entity types output from the one or more ET model(s) 104*a*-104*n*, where the model parameters defining each of the one or more ET model(s) 104*a*-104*n* are updated based on the comparisons (e.g. one or more loss functions associated with the ML technique may be computed for updating the model parameters defining the ET model(s) 104*a*-104*n*).

Once the ET model(s) have been trained the ET apparatus 104 may receive entity results for identifying entity types. These identified entity types may be used to disambiguate and/or correct any entity types that an NER system has previously attempted to predict in relation to the identified entities of the entity results. The ET identification apparatus 104 may input for an identified entity the portion of text excluding the character string associated with the identified entity to the one or more ET models. Alternatively or additionally, the ET identification apparatus 104 may input the portion of text and the location of the identified entity within the portion of text to one or more of the ET models, where the ET model may process the portions of text before and after the character string (or portion of text) describing the identified entity. An ET model 104*a* may process the portion of text surrounding the identified entity, in which the ET model 104*a* ignores or excludes the identified entity in the portion of text, to predict or identify the entity type associated with the identified entity.

Figure 1B:
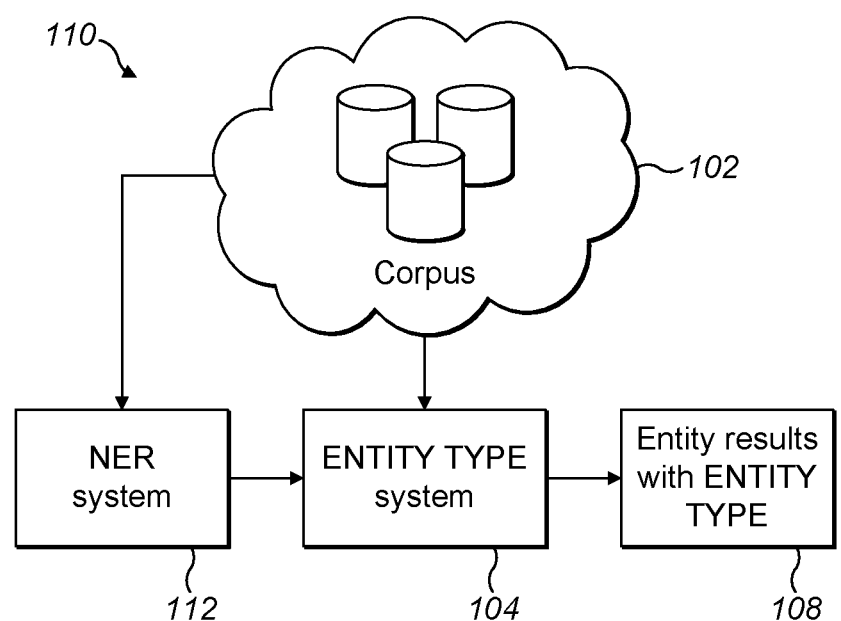
FIG. 1b is schematic diagram illustrating another example entity type (ET) identification system according to the invention.

FIG. 1*b* is a schematic diagram illustrating another example ET identification system 110 according to the invention based on the ET identification system 100 of FIG. 1*a*. In this example, an NER system 112 includes functionality such as an entity results module 106. The NER system 112 may be configured to identify entities and/or entity types from the corpus of text 102, and the entity results, which may include, as described with reference to FIG. 1*a*, data representative of the identified entities and an indication of the location of each entity within the corpus of text (e.g. a portion of text associated with the entity, or an indication of the location of the entity in a portion of text within the corpus of text, and the like). The entity results module 106 may send a set of entity results to the entity type (ET) apparatus 104, which is configured to process the entity results using one or more ET models 104*a*-104*n* for predicting and/or identifying the entity type for each entity of the entity results. The ET apparatus 104 may output the entity type identification results via the entity identification results module 108, which includes data representative of each entity of the set of entity results, an indication of the text portion (or location of the text portion in the corpus of text 102) associated with each entity, and the predicted/identified entity type of said each entity.

For example, the ET apparatus 104 may be configured to receive one or more entity results or a set of entity results from the NER system 112. Each entity result including data representative of a first portion of text before the location of an identified entity, and a second portion of text after the location of the identified entity within the corpus of text. Alternatively, each entity result may include data representative of the identified entity and a portion of text containing the identified entity, and/or an indication of the location of the entity within the corpus of text. It is to be appreciated by the skilled person that the entity results may be provided in any type of format or data structure that may be used by the ET apparatus 104 for identifying and/or retrieving the portions of text surrounding each identified entity in the entity results or as the application demands. The ET apparatus 104 may be configured to, for each identified entity in the entity results, extract or process each entity result containing an identified entity to determine and/or retrieve (e.g. retrieve form the entity result or from the corpus of text) the text surrounding the identified entity. For example, the ET apparatus 104 may retrieve, for each identified entity within the received set of entity results: a) a first portion of text prior and adjacent the text or character string representing the identified entity in the corpus of text 102, and b) a second portion of text after but adjacent the text or character string representing the identified entity in the corpus of text 102. The ET apparatus 104 is configured to identify an entity type for each identified entity of the received entity results by inputting the first and second portions of text associated with the identified entity in the corpus of text 102 into the one or more trained ET model(s) 104*a*-104*n*.

The model parameters of the ET model(s) 104*a*-104*n* are trained and configured for predicting, identifying, and/or extracting an entity type of said each identified entity from the corpus of text 102 based on the context of the text portion containing the identified entity in the corpus of text 102. The training dataset used for training the ET model(s) 104*a*-104*n* may be based on a plurality of labelled training data items including data representative of a plurality of known entities, with each known entity being labelled with a known entity type label and associated with a corresponding portion of text containing the known entity from a corpus of text. During training, the ML technique(s) that generate and/or update the model parameters of the ET model(s) by inputting data representative of, for each known entity and entity type label, a first text portion prior to the text or character string representing the known entity and a second text portion after the text or character string representing the known entity. The lengths of the first text portion and second text portion may vary depending on the location of the known entity within a sentence and/or paragraph of the portion of text associated with the known entity.

It is noted, that the character string of the identified entity in the text portion associated with the identified entity is not provided as input to the ET model(s) 104*a*-104*n* either during training or after training. This allows the ET model(s) 104*a*-104*n* to determine the entity type of the identified/known entity based on the context of the text portion associated with the identified/known entity whilst minimising the likelihood that the model parameters of the one or more ET model(s) 104*a*-104*n* become biased or overfitted towards known entities and associated entity types. This allows the ET model(s) 104*a*-104*n* to be more likely to predict the correct entity type when faced with unknown portions of text and/or new contexts in which an identified entity may be used, which an NER system 112 may be unable to determine correctly.

Based on the ET model(s) 104*a*-104*n* processing the first and second portions of text associated with each identified entity, the ET apparatus 104 may output data representative of the predicted/identified entity type for each identified entity. The entity identification results module 1087 may send data representative of the identified entity type of each entity in the received entity results to the NER system 112. Additionally or as an option, the entity identification results may be sent for further processing by the NER system 112. For example, the NER system 112 may use the entity identification results to correct or update the set of entity results initially derived from the corpus of text 102. Additionally or alternatively, the NER system 112 may be configured to update or correct the NER techniques within the NER system 112 used to identify entity types when processing the corpus of text. For example, the NER system 112 may include one or more NER models based on ML techniques that are configured for predicting/identifying entities within a corpus of text, and/or configured for predicting/identifying entity types of the identified entities in which the entity identification results may be used to update the NER models and/or generate new NER models for predicting/identifying entity types of identified entities. Additionally or alternatively, the NER system 112 may use NER techniques based on text/pattern matching and/or entity dictionaries (e.g. each entity dictionary including a plurality of entities associated with a particular entity type), where the entity dictionaries and/or entity type identification techniques may be updated based on the entity type identification results.

Figure 1C:
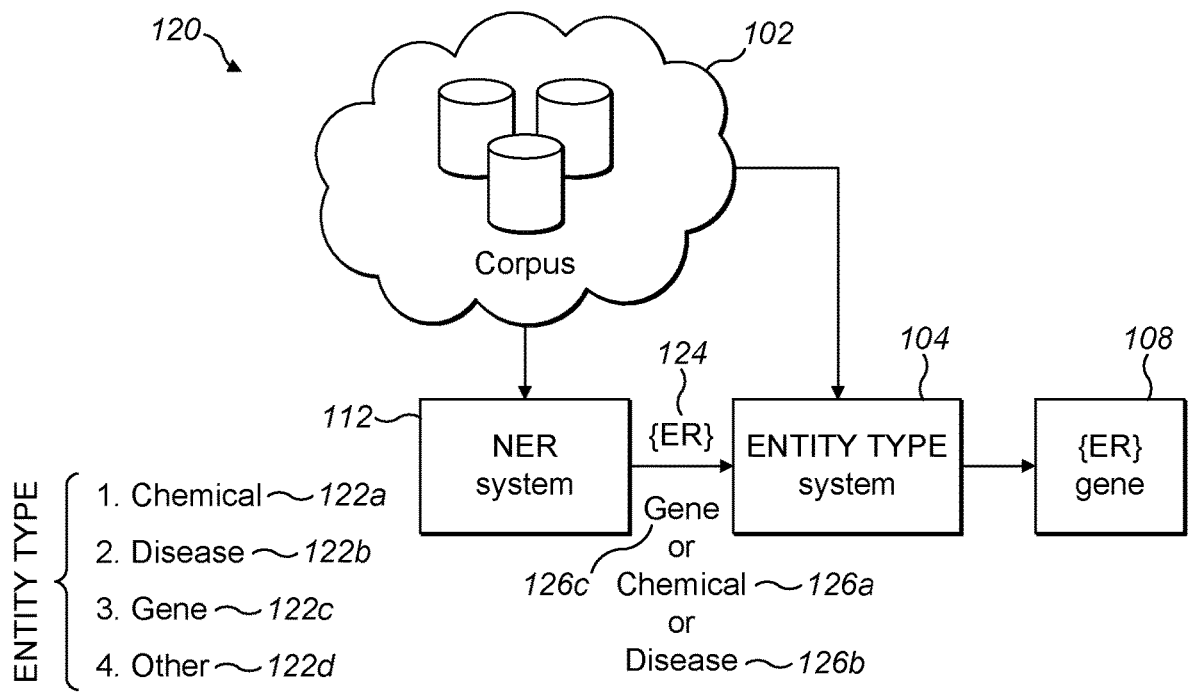
FIG. 1c is schematic diagram illustrating the example ET identification system for entity type disambiguation according to the invention.

FIG. 1*c* is schematic diagram illustrating another example ET identification system 120 for entity type disambiguation based on the ET identification system 100 of FIGS. 1*a* and 1*b*. In this example, an NER system 112 is configured for identifying entities from a corpus of text in the bioinformatics/chem(o) informatics field. The NER system 112 may use a plurality of entity dictionaries, each entity dictionary including entities of a particular entity type, along with pattern/text matching techniques for identifying entities from the corpus of text 102 and the entity type of each of the identified entities. Each entity type may be represented by a entity type label from a set of entity type labels. In this example, the set of entity types may include, by way of example only but is not limited to: a chemical entity type 122*a*, a disease entity type 122*b*, a gene entity type 122*c*, and an other entity type 122*d*. Each of these entity types may be given an entity type label from a set of entity type labels.

The chemical entity type 122*a* is used to label and identify entities from the corpus of text that are determined to be chemicals. The disease entity type 122b is used to label and identify entities from the corpus of text that are determined to be diseases. The gene entity type 122b is used to label and identify entities from the corpus of text that are determined to be genes. The other entity type 122b is used to label and identify entities from the corpus of text that are not considered or not determined to be of the chemical, disease or gene entity type. These may include ambiguous entities that the NER system 112 cannot determine as belonging to the chemical, disease or gene entity types. For example, sometimes researchers may use the same entity name in different contexts when describing genes, chemicals, and/or diseases. This may cause incorrect identification of the entity type of an identified entity, which the NER system 112 may not be able to cope with. Although there may be various selection strategies for the NER system 112 to select an entity type, these might lead to incorrect or incomplete identification of an entity, which may affect the accuracy of downstream processes relying on correct identification of entities and entity types in a corpus of text. For example, a selection strategy when an NER system 112 cannot determine an entity type of an entity may be to make a default selection by choosing the entity type from an ordered list of entity types 122a-122d, 1. Chemical; 2. Disease; 3. Gene; 4. Other. Another example, the selection strategy may be simple for the NER system 112 not to provide an entity type label labels the entity as an other entity type.

When the NER system 112 identifies an entity within the corpus of text that belongs to one or more of these entity types 122a-122d, it may record and/or store data representative of the entity and the most likely entity type (e.g. Gene 126a, Chemical 126b, Disease 126c or Other) that the entity belongs to in a set of entity results 124 along data representative of the location of the text portion containing the entity or a text portion containing the entity from the corpus of text. An entity result module 106 or other functionality of the NER system 112 may be configured to send the set of entity results or a portion/selection of the set of entity results (e.g. those entities that have ambiguous entity types or entity types such as other entity type) to the ET identification apparatus 104 for further processing/analysis.

The ET identification apparatus 104 receives one or more entity results from the NER system 112. As described, each entity result may include data representative of an identified entity, an identified entity type and a location of the identified entity within the corpus of text. Alternatively, each entity result may include data representative of an identified entity and either: an indication of the location of the identified entity within the corpus of text, or a text portion containing the identified entity within the corpus of text. The ET identification apparatus is configured to input, for each of the entity results, text associated with the location of said each entity in the corpus of text to a trained ET model, which is trained and configured for predicting or extracting an entity type of said each entity from the corpus of text. The text that is input for an identified entity or an entity result may be the text surrounding the identified entity, which may not include the text or character string representing the identified entity within the input text. The ET model may output entity type identification results for each identified entity of the received set of entity results.

Furthermore, the NER system 112 and/or the ET identification apparatus 104 may also be configured to identify ambiguous entity types between multiple entity results associated with related portions of text when said multiple entity results represent the same entity in which at least one of the multiple entity results has a different entity type as the other of the multiple entity results. This may indicate an ambiguity in the entity type given to an identified entity. For each of the multiple entity results, a portion of text associated with the location of said each entity in the corpus of text may be input to a trained ET model of the ET identification apparatus 104, where the ET model is trained or configured for predicting or extracting an entity type of said each entity from the corpus of text. Again, the text that is input for an identified entity or an entity result may be the text surrounding the identified entity, which may not include the text or character string representing the identified entity within the input text.

The ET identification apparatus 104 or an ET model may aggregate the predicted or extracted entity types of the multiple entity results associated with the related portions of text for outputting an entity type representative of the multiple entity results. Furthermore, the related portions of text associated with the multiple entity results may be located in the same document or same body of text from the corpus of text. Thus, the ET identification apparatus 104 may be further configured to aggregate the predicted or extracted entity types of the multiple entity results for the document/body of text by aggregating the predictions for each entity of the multiple entity results together to form an overall prediction for the entity type of the entities of the multiple entity results. The entity type representative of the multiple entity results may be output to the entity identification result module 108, which may send the entity type identification results to the NER system 112 for updating the corresponding identified entities and/or set of entity results.

Figure 1D:
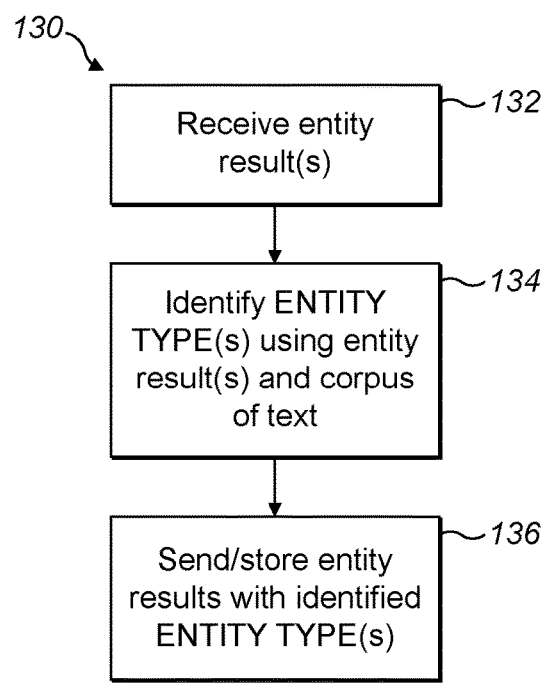
FIG. 1d is a flow diagram illustrating an example process for performing ET identification according to the invention.

FIG. 1d is a flow diagram illustrating an example process 130 of performing ET identification within a corpus of text according to the invention. The process 130 may include the following steps of: in step 132, receiving one or more entity results, each entity result including data representative of an identified entity and a location of the identified entity within the corpus of text. In step 134, identifying an entity type for each entity of the received entity results by inputting text associated with the location of said each entity in the corpus of text to a trained ET model configured for predicting or extracting an entity type of said each entity from the corpus of unstructured text. For example, inputting text associated with the location of said each entity may include inputting text before and after the location of said each entity in the corpus of text. The input text may not include the text or character string representing the entity. In step 136, the ET model(s) may output entity type identification results including data representative of the identified entity type of each entity in the received entity results. This may include sending the entity type identification results with the identified entity types for each of the entities of the received entity results to an NER system or other systems that may use the entities and identified entity types.

Figure 1E:
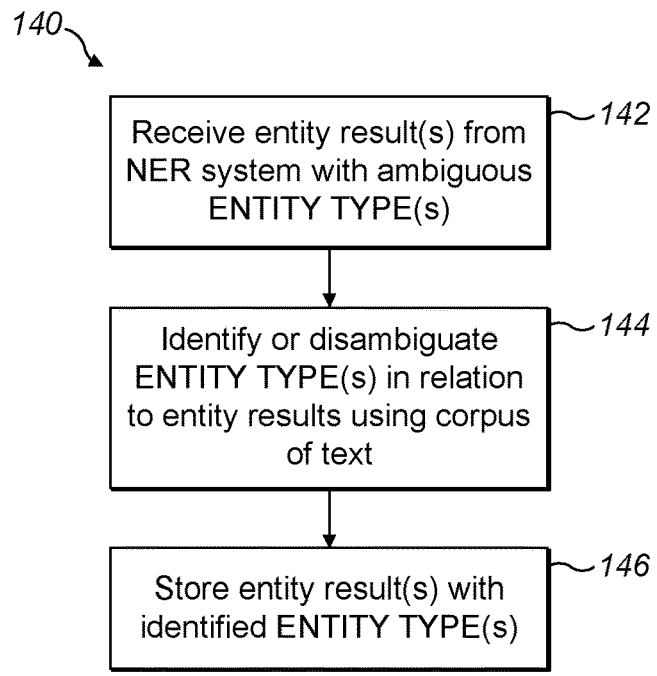
FIG. 1e is a flow diagram illustrating another example process for ET identification for entity type disambiguation according to the invention.

FIG. 1e is a flow diagram illustrating another example process 140 for ET identification for entity type disambiguation according to the invention. The process 140 may include at least the following steps of: In step 142, receiving one or more entity results from an NER system or other system, where each entity result includes data representative of an identified entity, an identified entity type and/or a location of the identified entity within the corpus of text. In step 144, identifying and disambiguating entity type(s) in relation to entity results based on the corpus of text. This may include identifying ambiguous entity types between multiple entity results associated with related portions of text when said multiple entity results represent the same entity in which at least one of the multiple entity results has a different entity type as the other of the multiple entity results. Identifying entity types may further include inputting, for each of the multiple entity results, text associated with the location of said each entity in the corpus of text to a trained ET model configured for predicting or extracting an entity type of said each entity from the corpus of text. Inputting the text associated with the location of said each entity further includes inputting text before and after the location of said each entity in the corpus of text. Aggregating the predicted or extracted entity types of the multiple entity results associated with the related portions of text for outputting an entity type representative of the multiple entity results. In step 146, the ET model(s) may output entity type identification results including data representative of the identified entity type of each entity in the received entity results. This may include sending the entity type identification results with the identified entity types for each of the entities of the received entity results to an NER system or other systems that may use the entities and identified entity types.

Figure 1F:
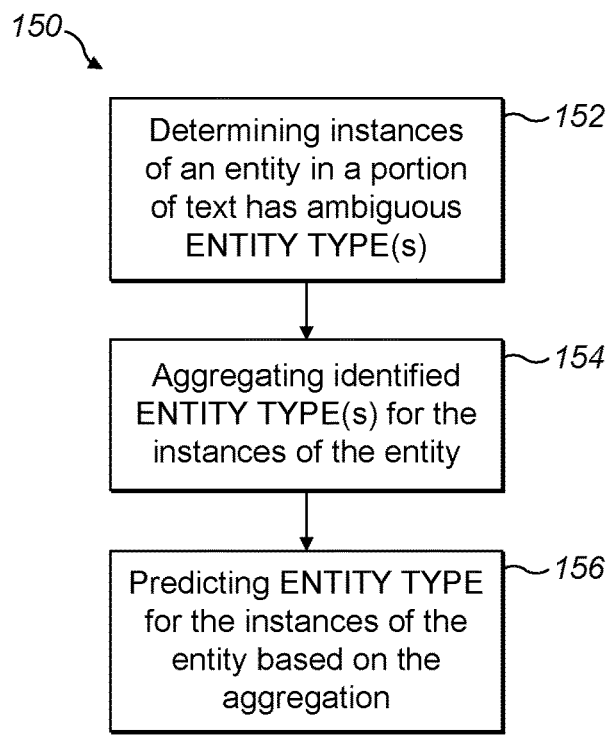
FIG. 1f is a flow diagram illustrating an example process for ET aggregation during ET identification according to the invention.

FIG. 1f is a flow diagram illustrating an example process 150 for entity type aggregation during ET identification as outlined in process 140 of FIG. 1e. The process 150 may be performed when there are multiple entities that are the same in a portion of text in which some have different entity types, thus there may be a ambiguity in the entity type of the multiple entities. The process 150 may include the following steps of: In step 152, determining and/or identifying instances of an entity in a portion or body of text having ambiguous entity types. For example, multiple entity results in relation to the same identified entity associated with a body of text or related portions of text may have different entity types. This may be an indication that the identified entity has an ambiguous entity type for the body of text. When said multiple entity results represent the same entity in which at least one of the multiple entity results has a different entity type as the other of the multiple entity results, then these multiple entity results may be ambiguous and require disambiguation. The entity types for each of the multiple entity results may be identified, as described in any of FIGS. 1a to 1e, by inputting for each of the multiple entity results, text associated with the location of said each entity in the corpus of text to the trained ET model, which is trained and configured for predicting or extracting an entity type of said each entity from the corpus of text. In step 154, the identified entity types may be aggregated to determine an overall entity type for the multiple entity results. For example, aggregating the predicted or extracted entity types of the multiple entity results associated with the related portions of text for outputting an entity type representative of the multiple entity results. In step 156, when the related portions of text or body of text are located in the same document from the corpus of text, aggregating the predicted or extracted entity types of the multiple entity results for the document may further include predicting entity type for the entity instances of the multiple entity results by aggregating the predictions for each entity of the multiple entity results to form an overall prediction for the entity type of the entities of the multiple entity results.

Figure 2A:
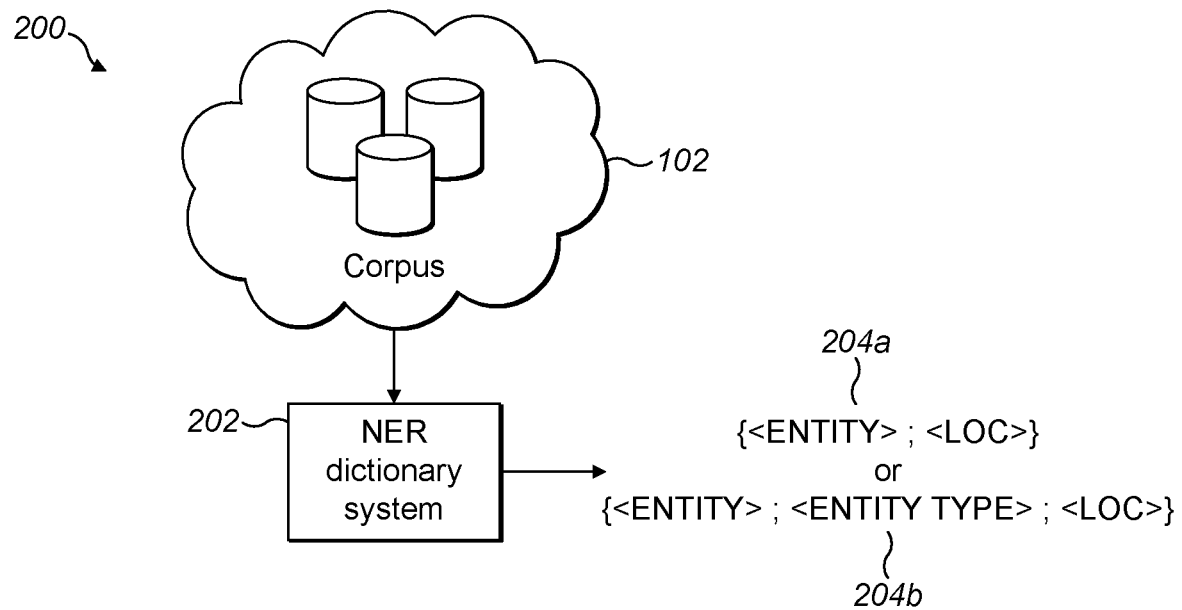
FIG. 2a is a schematic diagram illustrating an example named entity recognition (NER) system based on entity dictionaries for generating entity results from a corpus of text.

FIG. 2a is a schematic diagram illustrating an example named entity recognition (NER) system 200 in which a NER dictionary-based system 202 uses entity dictionaries for generating entity results 204a or 204b from a corpus of text 102. The entity dictionaries are used to identify entities and their corresponding entity type within a corpus of text/documents 102 when input into the NER dictionary-based system 202, where text matching techniques may be applied to the corpus of text 102 based on the entity dictionaries. The text matching techniques may be conventional text matching techniques used for identifying possible entities and entity types, where a first set of entity results 204a or 204b is generated (e.g. a list of entities, corresponding entity types, and indication of entity position within the text of the corpus of text).

The processing of the corpus of text 102 may be achieved using the text matching techniques to identify any entities from each entity dictionary that may match phrases, portions of characters, and/or character strings in portions of text or text documents and the like from the corpus of text/documents 102. Those character strings that match an entity within an entity dictionary are stored in a set of entity results as identified entities. Each identified entity within the set of entity results may include data representative of: the identified entity, an entity type of the identified entity, an indication of the position within the text or text document the identified entity occurs, and/or, optionally, a document identifier of the document/text from the corpus of text/documents 102 that the entity occurs within.

The set of entity results may include multiple entities of the same type but which occur in different positions within a portion of text or document, and/or occur in different portions of text and/or documents of the corpus of text/documents 102. The set of entity results may be represented by any suitable data structure such as, by way of example only but not limited to, data representative of a list of entities and/or a table of entities, where each row represents an identified entity, and each column represents information associated with the identified entity including, by way of example only but not limited to, a character string or text portion representing the identified entity, a label or data representative of an entity type for the identified entity, and/or an indication of the position of the identified entity within the corpus of text 102. The list or table may be represented as a data structure or a plurality of records in a database or library that represents each identified entity and the like.

The NER system 202 may include a plurality of entity dictionaries in which each of the entity dictionaries represent entities of a particular entity type (e.g. a drug entity dictionary, a chemical entity dictionary, a gene entity dictionary, a disease/condition entity dictionary, etc.) and are populated with known or manually curated entities associated with that entity type. Entity types of interest from the bioinformatics and/or chem(o)informatics fields may include, by way of example only but it not limited to, drugs, proteins, genes, chemical, tissues cells, cell-lines, treatments, diseases/conditions or any other entity type associated with bioinformatics and/or chem(o)informatics. For simplicity, the examples provided herein are based on the bioinformatics and/or chem(o)informatics fields. Although entity types of interest from the bioinformatics and/or chem(o)informatics fields are described, this is for simplicity only and by way of example only, it is to be appreciated by the skilled person that the present invention is not limited to only entity types from the bioinformatics and/or chem(o)informatics fields and/or applications therein, but that the present invention is applicable to any entity type from any other field and any other suitable application or as the application demands.

Each of the entity dictionaries are usually manually annotated with entities of a particular entity type. It is apparent that entity dictionaries can become outdated very quickly because of ongoing research generating unstructured text such as articles, reports, documents, test results, etc. in each of the fields associated with each entity type. Thus, the corpus of text 102 may always be updated or regularly updated with the latest research that is generated. This also means that the entity dictionaries of the NER dictionary-based system 202 has to be regularly updated to ensure it has a chance at identifying entities and/or entity types from the corpus of text 102 correctly. However, such systems are heavily reliant on up-to-date entity dictionaries, which is typically not possible to achieve given the amount of new documents/text and the like that is added to the body of human knowledge in the various fields of science (e.g. bioinformatics and/or chem(o)informatics. Thus, inaccuracies in the entity results is inevitable with such NER dictionary-based systems.

The NER dictionary-based system 202 processes the corpus of text/documents 102 to generate the first set of entity results list 206. The set of entity results may be collated and provided as data representative of a list or table of identified entities, identified entity types, and/or position(s) where the identified entities/entity types occur within text/documents of the corpus of text/documents. For example, each piece of text or document may be thought of as a string or an array of characters, in which the position of an entity may be based on the first and last character indices of that portion of text identified to represent that entity.

For example, a document or text document from a corpus of text 102 may include, by way of example only but not limited to, 5000 characters including spaces, where each consecutive character is indexed with a consecutive index from 1 to 5000. The document may be in the field of bioinformatics/chem(o)informatics and have a phrase or sentence of text starting at a character index 100 of a text document from the corpus of text 102 that may read "Paracetamol is used to treat a headache". This sentence has two entities, "Paracetamol" of the drug entity type and "headache" of the disease/condition entity type, respectively. Thus, the NER dictionary-based system 202 may use a drug entity dictionary 106a, which includes a list of known entities of the drug entity type such as "Paracetamol", along with the text matching techniques 204 to identify that this sentence of text includes the entity "Paracetamol" of the drug entity type. The entity "Paracetamol" has a position defined by starting character index 100 through to ending character index 110 in the text document. The NER dictionary-based system 202 may also use a disease/condition entity dictionary 106d along with the text matching techniques 204 to identify that this sentence of text also includes the entity "headache" of the disease/condition entity type, which has a position defined by starting character index 131 and ending character index 138 of this text document. This is performed throughout the text document and also the text documents in the corpus of text 102 to identify entities, entity types and/or positions of the entities within the corpus of text based on the entity dictionaries of the NER system 202.

As described previously, the set of entity results 204a or 204b may include data representative of the identified entity and corresponding identified entity type, position within the text of the identified entity, and/or, optionally, a text document identifier or link and the like for identifying which portion of text, document from the corpus of text/documents the identified entity occurs. For example, each entity result of a set of entity results 204a may be based on a data structure with a format based on: {<entity>; <loc>}, where <entity> comprises data representative of an identified entity and <loc> comprises data representative of an indication of the location of an entity within a corpus of text 102. In another example, each entity result of the set of entity results may be based on a data structure with a format based on: {<entity>; <entity type>; <loc>}, where <entity> comprises data representative of an identified entity; <entity type> comprises data representative of the entity type of an identified entity (e.g. an entity type label); and <loc> comprises data representative of an indication of the location of an entity within a corpus of text 102. The <loc> data that represents an indication of the location of an entity within a corpus of text 102 may be represented in any manner suitable for identifying the portion of text associated with the identified entity within the corpus of text 102. For example, the entity result of a set of entity results may be based on a data structure with a format based on: {<entity>, <entity type>, <loc>} where <loc> includes data representative of {<position—starting character index>:<position—ending character index>, <text document ID>}. The above "Paracetamol/Headache" sentence may be represented, by way of example, by the following rows and columns of an entity result list 204b that includes data representative of:

| <entity> | <entity type> | <start char index>:<end char index> | <document ID> |
|---|---|---|---|
| Paracetamol | Drug | 100:110 | 102i |
| Headache | Disease/condition | 131:138 | 102i |
| ... | ... | ... | ... |

Figure 2B:
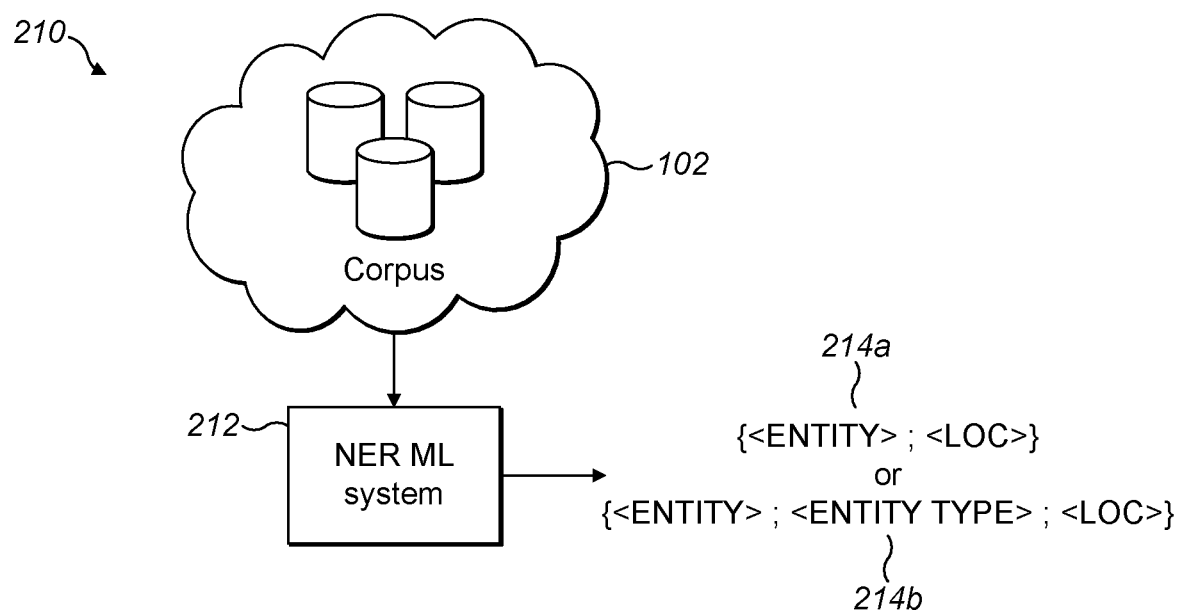
FIG. 2b is a schematic diagram illustrating an example NER system based on machine learning model(s) for generating entity results from a corpus of text.

FIG. 2b is a schematic diagram illustrating another example NER system 210 in which an NER-ML system 212 uses one or more machine learning techniques to create one or more NER model(s) for generating entity results 214a or 214b from a corpus of text 102 or unstructured text and the like. A large set of training data is generally required in order to apply one or more ML technique(s) to create a trained NER model that is robust enough to identify and extract entities, entity types and/or relationships from a corpus of text 102. The ML technique(s) may be trained by using a labelled training dataset associated with entities and/or entity types and the like, which can be generated manually, semi-automatically, or automatically. The labelled training dataset may include a plurality of training data instances or a labelled set of training data instances. Each labelled training data instance may include data representative of a portion of text including one or more known entities and an indication of the position of each of the one or more known entities within the portion of text. Each of the one or more entities of said each labelled training data instance may also be annotated with known entity type label(s) indicating the entity type of each of those one or more known entities.

For example, each training data instance may include data representative of a particular portion of text containing an known entity (e.g. a sentence containing a known entity of interest) and an indication of the position of that known entity within the particular portion of text. The training data instance may be further annotated with an entity type label based on the type of known entity contained in the particular portion of text. The ML technique uses the labelled training dataset to generate a NER ML model based on the labelled training dataset, where the trained NER ML model is configured to predict, identify and/or extract one or more entities and/or entity types associated with the labelled training dataset from a corpus of text 102. It is to be appreciated that the NER model may be configured to generate a set of entity results 214a and/or 214b and the like as described, by way of example only but is not limited to, with reference to FIG. 2a. It is to be noted that the accuracy and robustness of any NER model depends on both the design/type of one or more ML technique(s) used to generate the NER model, but more importantly, on the size, diversity, accuracy, of the labelled training dataset.

For example, NER systems using ML techniques and NER ML model(s) may be able to take into account the context of entities within documents, but this is limited by the extent of the labelled training datasets and examples of entity usage therein, where specific text instances of each known entity's name and context may provide prediction, identification and/or classification of entities and/or entity types for the particular contexts defined in the labelled training dataset. However, such specificity can often lead to overfitting of learned entities and entity types and a biased NER ML-based model. That is, an NER ML-based system that has learnt the most popular entity type that is most common for a given entity name and typically biases its prediction towards this entity type.

Due to the increasing amount of human knowledge and discoveries, text, documents, research and the like that is continuously or periodically generated, by way of example only but is not limited to, in the scientific and/or research communities that may be fed into a corpus of text, both NER dictionary-based systems 202 and NER ML-based systems 204 as described with reference to FIGS. 2a and 2b are at risk becoming out-of-date almost immediately when implemented or trained; which leads to ambiguous and/or inaccurate entity results in which identified entities have incorrect or ambiguous entity types that each system 202 or 204 cannot correctly or adequately resolve. This requires all entity results being manually curated, checked and validated, which is costly in terms of time and resources. The ET identification system according to the invention as described with reference to FIGS. 1a-1e and herein, is configured to process a set of entity results and identify entity types by taking into account the context an identified entity or entities appear within a corpus of text whilst minimising any bias of known entities and entity types.

Figures 3A, 3B:
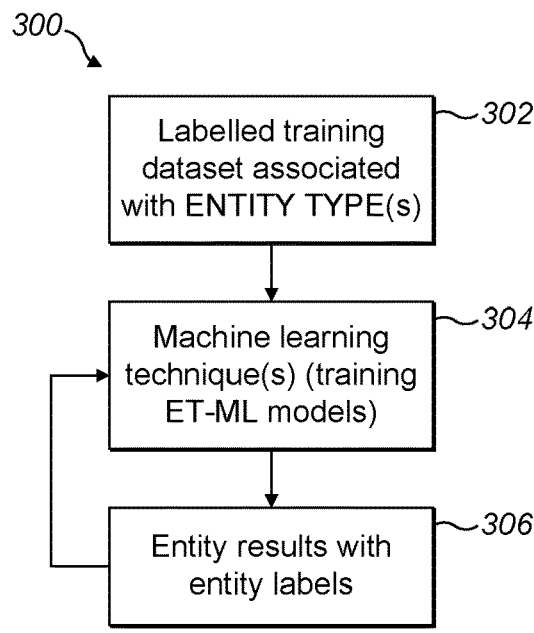
FIG. 3a is a schematic diagram illustrating an example ET machine learning (ET-ML) system when training for an ET identification system according to the invention.
FIG. 3b is a schematic diagram illustrating the example ET-ML system of FIG. 3a when trained for an ET identification system according to the invention.

FIG. 3a is a schematic diagram illustrating an example training ET identification system 300 according to the invention for training machine learning (ML) technique(s) to generate trained ET model(s) for use with an NER system. The training ET identification system 300 includes a training dataset module 302, ML technique module 304, and update module 306. The training dataset module 302 is configured to provide the ML technique module 304 with labelled training datasets associated with known entities annotated with an entity type label for each known entity. For example, a labelled training dataset may include a plurality of labelled training data instances for each of a plurality of entities, where a labelled training data instance includes data representative of a text portion containing a known entity, the position of the known entity in the text portion, and an entity type label. As another example, the labelled training dataset X may include a plurality of labelled training data instances $\{x_1, \ldots x_i, \ldots, x_T\}$ for $1 \leq i \leq T$, where T is the number of labelled training data instances in the labelled training dataset X. Each labelled training data instance $x_i$ may include data representative of the portion of text containing the known entity, the position of the known entity within the portion of text, and an type label variable $\ell_i$ for $1 \leq i \leq L$ from a set of binary or non-binary labels $\mathcal{L} = \{\ell_1, \ldots, \ell_i, \ldots, \ell_L\}$, each representing an entity type, where $L \geq 1$ is the number of entity types that are to be modelled.

The ML technique module 304 is configured to use the labelled training dataset to train one or more ML technique(s) for generating one or more ET model(s) for predicting, identifying and/or classifying entity types for identified entities from a set of entity results generated by an NER system as described with reference to FIGS. 1a-2b. An ET model may be configured to output entity type identification result data representative of an indication of an entity type for each of the identified entities. The update module 306 is configured to receive the entity type identification results/labels associated with the labelled training datasets and determine whether the ET model(s) have been sufficiently trained, or require further training iterations based on the labelled training datasets. If further training is required, then the ML technique module 304 is configured to update the model parameters of the ET model(s) based on lass functions and the like associated with the corresponding ML technique(s) and to continue training the ET model(s) based on the labelled training datasets from the training dataset module 302. If further training is not required, then the ET model(s) may be considered to be trained in relation to predicting, identifying and/or classifying entity types for identified entities when given a text portion from a corpus of text containing an identified entity and the like. Overfitting may be alleviated if the ET model(s) are trained on portions of text surrounding the known entity. In some examples, this involves excluding the known entity from the portion of text surrounding the known entity to avoid or reduce/minimise overfitting and/or bias in the ET model in relation to each known entity.

FIG. 3b is a schematic diagram illustrating the example ET-ML system 310 of FIG. 3a when trained for an ET identification system according to the invention. A corpus module 312 may store and/or retain a corpus of text/documents or unstructured text that may be processed by an NER system for predicting, identifying and/or classifying entities and entity types from the corpus of text. The corpus of text may be updated continually, aperiodically, or periodically as the application demands. The corpus module 312 may input the corpus of text, or even a subset of the corpus of text for processing to an NER system (e.g. NER systems 200 or 210 of FIGS. 2a or 2b), which may output a set of entity results as described herein where each entity result includes data representative of at least: an identified entity and a location of the identified entity within the corpus of text or a text portion from the corpus of text that includes the identified entity (e.g. a text portion including the identified entity with a first portion of text prior to the character string or text representing the identified entity, and second portion of text after the identified entity). The entity results may also include an entity type and the like. The NER system 200 or 210 may provide one or more entity results of the set of entity results to an ET identification system 316 including one or more trained ET model(s). These ET model(s) may each output data representative of a set of entity type identification results and/or labels for each identified entity of the received entity results, which may be collated from each of the ET model(s) by entity result module 318. The entity result module 318 may thus output a set of entity type identification results for use by the NER systems 200 or 210. This set of entity type identification results may be used in the NER systems as described with reference to FIGS. 1a-2b or as described herein for updating the entity types of their set of entity results, which may also be used to update the entity dictionaries and/or NER models of the NER systems 200 or 210 and the like. The entity type identification results may be used for updating the labelled training dataset(s) as described with reference to FIG. 3a for training ET model(s), and/or the labelled training dataset(s) as described with reference to FIG. 2b for training NER ML model(s) and the like.

Furthermore, in addition or alternatively to identifying entity types for each of the entities of the entity results, the ET identification system 216 and/or ET model(s) used therein may be configured to determine whether there are ambiguous entity types given to multiple instances of an identified entity within the same text document or section of text from the corpus of text. The ET identification system 310 may include an aggregation module 319 for identifying such ambiguous entity types by, for example, identifying the entity type for each of the multiple instances of the identified entity using the ET model(s), and aggregating, consolidating, or combining the identified entity types of the multiple instances of the identified entity to form one entity type that covers the multiple instances. For example, the ET model(s) may output, for each instance of an identified entity, a probability entity type vector for all entity types a set of entity types, where each element of the probability entity type vector represents a particular entity type. The probability entity type vectors for the multiple instances of the identified entity may be averaged or combined in a weighted linear combination to form a single probability entity type vector representing the entity type of the multiple instances. That is, the entity type corresponding to the probability entity type vector element having the largest probability may be used to form the entity type for each of the multiple instances of the identified entity.

Figure 3C:
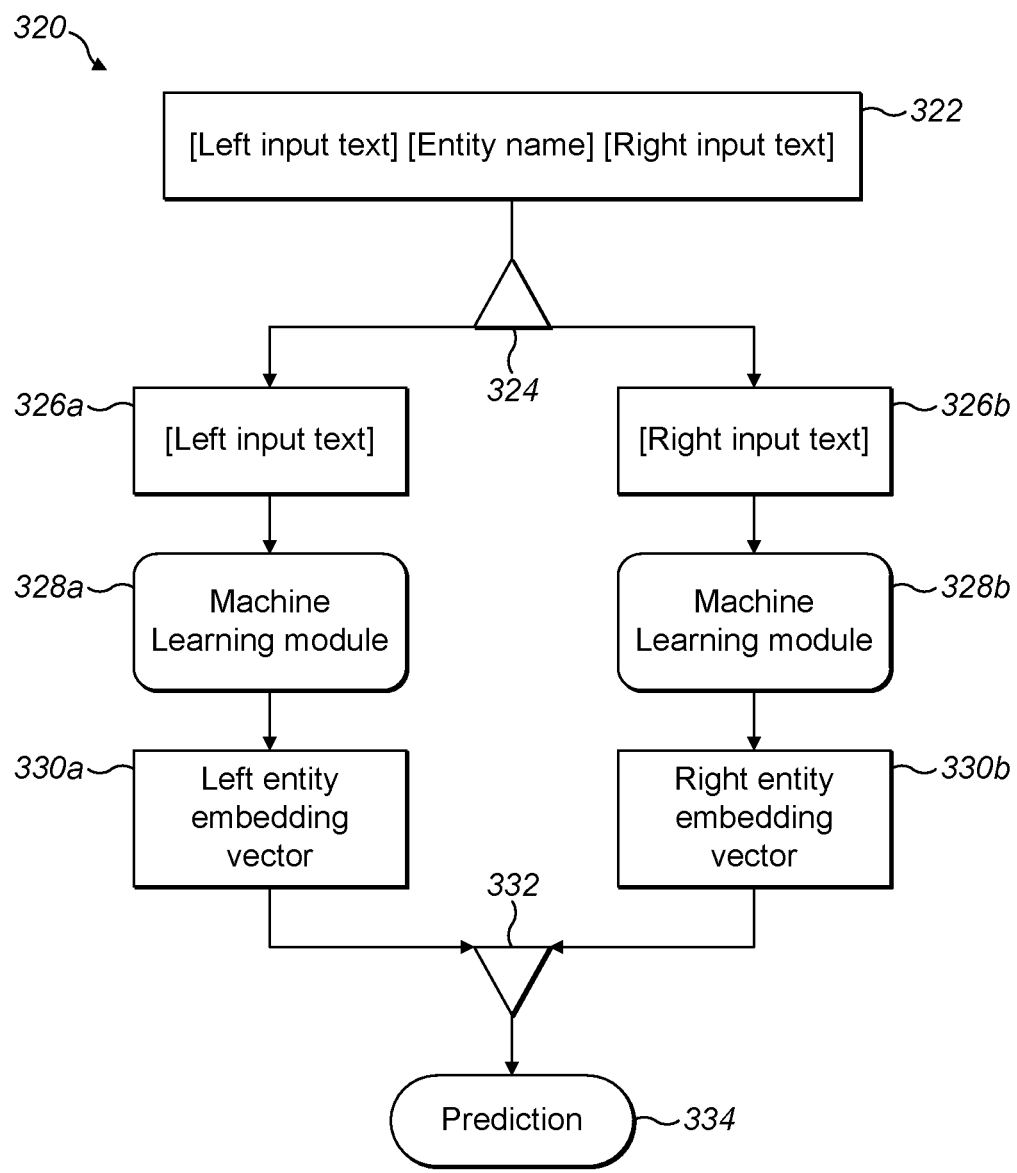
FIG. 3c is a schematic diagram illustrating an ET-ML model for use with an ET-ML system according to the invention.

FIG. 3c is a schematic diagram illustrating an ET-ML model 320 (or ET model) for use with an ET identification system as described, by way of example only but not limited to, with reference to FIGS. 1a-3b and herein in accordance with the invention. The ET-ML model 320 may be used for identifying entity types based on an identified entity and the text from the corpus of text surrounding the identified entity. This may also be used to disambiguate one or more entity types of identified entities from a set of entity results output from an NER system 200 or 210. The ET-ML model 320 is illustrated as receiving data representative of an input text portion 322 associated with an identified entity from a corpus of text. The portion of text 322 includes the text or character string of the identified entity and the characters of the surrounding text, which may be of the form [Left Input Text][Entity Name][Right Input Text]. That is, the portion of input text 322 includes data representative of a first input text portion prior to the identified entity (e.g. [Left Input Text]), data representative of the identified entity (e.g. [Entity Name]), and data representative of a second input text portion after the identified entity (e.g. [Right Input Text]). The portion of text surrounding the identified entity is processed by the ET-ML model 320, which is configured to output a prediction of the entity type for the identified entity.

In particular, the ET-ML model 320 receives the input portion of text 322, which may be an input string of text 322 comprising the first portion of text, which may be a left string of input text (e.g. [Left Input Text]), an identified entity name or character string of the identified entity name in the portion of text 322 (e.g. [Entity Name]), and the second portion of text, which may be a right string of input text (e.g. [Right Input Text]. The string of text 322 is split by a text splitter 324 into separate left and right text components 326a and 326b, where the entity name itself is discarded. The left and right text components 326a and 326b may be encoded or embedded into data representing the left and right text components 326a and 326b for use with a first and second ML module 328a and 328b, respectively.

The first ML module 328a operates on data representative of the left input text 326a to produce a first entity type vector embedding representation 330a based on the left input piece of text 326a. The first entity type vector embedding representation 330a may be an N-dimensional vector of an N-dimensional vector space, where N>1. The second ML module 328b operates on data representative of the right input text 326b to produce a second entity type vector embedding representation 330b based on the right input piece of text 326b. The second entity type vector embedding representation 330b may also be an N-dimensional vector of an N-dimensional vector space, where N>1. An entity type vector combiner 332 combines the first and second entity type vector embedding representations 330a and 330b to form an overall entity type prediction vector 334 for the entity type of the identified entity (e.g. [Entity Name]). The entity type prediction vector 334 may be an L-dimensional vector of an L-dimensional vector space representing the probabilities of a set of binary or non-binary entity type labels $\mathcal{L} = \{\ell_1, \ldots, \ell_l, \ldots, \ell_L\}$ for $1 \leq l \leq L$, where $L \geq 1$ is the number of entity types that are to be modelled by the ET identification model 320. The 1-th element of the entity type prediction vector 334 may represent the probability or likelihood that the identified entity is of entity type label $\ell_l$.

The first ML module 328a includes a first portion of the ET ML model 320 (or a first ET ML model) that is configured and trained by a first ML technique using a labelled training dataset. The second ML module 328b includes a second portion of the ET ML model 320 that is also configured and trained by a second ML technique using the labelled training dataset. The first and second ML techniques may be the same or different ML techniques. The first and second ML technique(s) may be jointly trained to generate the first and second portions of the ET ML model 320. The labelled training dataset X may include a plurality of labelled training data instances $\{x_1, \ldots x_i, \ldots, x_T\}$ for $1 \leq i \leq T$, where T is the number of labelled training data instances in the labelled training dataset X. Each labelled training data instance $x_i$ may include data representative of the portion of text containing the known entity (e.g. [Left Input Text][Entity Name][Right Input Text]), the position of the known entity within the portion of text (e.g. [Entity Name]), where the labelled training data instance is labelled with an entity type label $\ell_l$ for $1 \leq l \leq L$ from a set of binary or non-binary entity type labels $\mathcal{L} = \{\ell_1, \ldots, \ell_l, \ldots, \ell_L\}$, each label in the set of entity type labels representing an entity type, where $L \geq 1$ is the number of entity types that are to be modelled by the ET model 320.

The first ML module 328a and second ML module 3428b may be jointly trained based on iterating over the labelled training dataset. The first ML module 328a outputs a first entity type vector embedding representation 330a, which may be an N-dimensional vector of an N-dimensional vector space, where N>1. The second ML module 328b outputs a second entity type vector embedding representation 330b, which may be an N-dimensional vector of an N-dimensional vector space, where N>1. The first and second entity type vectors 330a and 330b are combined to form the entity type prediction vector 334. The entity type prediction vector 334 may be an L-dimensional vector of an L-dimensional vector space representing the probabilities of a set of binary or non-binary entity type labels $\mathcal{L} = \{\ell_1, \ldots, \ell_l, \ldots, \ell_L\}$ for $1 \leq l \leq L$, where $L \geq 1$ is the number of entity types that are to be modelled by the ET identification model 320. The model parameters of the first portion of the ET ML model 320 and second portion of the ET ML model 320 are updated based on a comparison or error vector generated, for each labelled training data instance, between the estimated output of the prediction entity type vector 334 with the corresponding entity type label of the labelled training data instance. For example, a loss function of the corresponding ML technique(s) may be used to update the model parameters of the first and second portions of the ET ML model 320 in each iteration over the labelled training dataset until the first and second portion of the ET ML model 320 are validly trained (e.g. when a number of incorrectly predicted entity types is below a prediction error threshold).

The entity type vector combiner 332 for combining the embedded vectors 330a and 330b to produce an L-dimensional prediction entity type vector 334 may include the following steps of: concatenating the first and second vector entity type embeddings 330a and 330b output from the first and second ML modules 328a and 328 based on the left input text 326a and the right input text 326b, respectively; and reducing the dimensionality of the resulting vector to the number of possible entity types (or classes) of a set of predefined entity types (e.g. drug entity type, gene entity type, chemical entity type, protein entity type, other entity type). The output prediction entity type vector 334 may consist of a probability vector representing the likelihood of the entity being one of a number L of different entity types, with each vector element corresponding to a different entity type from the set of entity types (e.g. set of entity type labels $\mathcal{L} = \{\ell_1, \ldots, \ell_l, \ldots, \ell_L\}$ for $1 \leq l \leq L$).

The ET model 320 may be based on a neural network, in which the first and second ET modules 328a and 328b may be based on a joint ML neural network technique. The first portion of the ET model 320 of first ML module 328a may be considered a first ML model. The second portion of the ET model 320 of second ML module 328b may be considered a second ML model. The first ML model (or first portion of the ET model 320) of the first ML module 328a may include forward hidden states of a neural network configured for representing a first portion of text 326a before the location of the identified entity (e.g. Left Input Text). The second ML model (or second portion of the ET ML model 320) of the second ML module 328b may include backward hidden states of the neural network configured for representing a second portion of text 326b after the location of the identified entity (e.g. (Right Input Text). The forward and backward hidden states may be concatenated together for generating an entity type representation of the first and second portions of text 326a and 326b. For example, the first and second ML modules 328a and 328b operating on the left and right input text 326a and 326b may consist of a joint ML technique such as a bi-directional long short-term memory (LSTM) ML system. This system may be trained on text surrounding a number of pre-labelled, unambiguous known entities of known entity types in order to learn the entity types of left and right input text co-occurring with each of the entity types, where the bi-directional LSTM ML system can then categorise identified entities according to these entity types.

The labelled training dataset X may include a plurality of labelled training data instances $\{x_1, \ldots x_t, \ldots, x_T\}$ for $1 \leq i \leq T$, where T is the number of labelled training data instances in the labelled training dataset X. Each labelled training data instance $x_i$ may include data representative of the portion of text containing the entity and be labelled with at least one of: 1) an indication of the position of the entity within the portion of text; and 2) an entity type label variable $\ell_l$ for $1 \leq l \leq L$ from a set of binary or non-binary labels $\mathcal{L} = \{\ell_1, \ldots, \ell_l, \ldots, \ell_L\}$, each representing an entity type, where $L \geq 1$ is the number of entity types that are to be modelled.

Figure 3D:
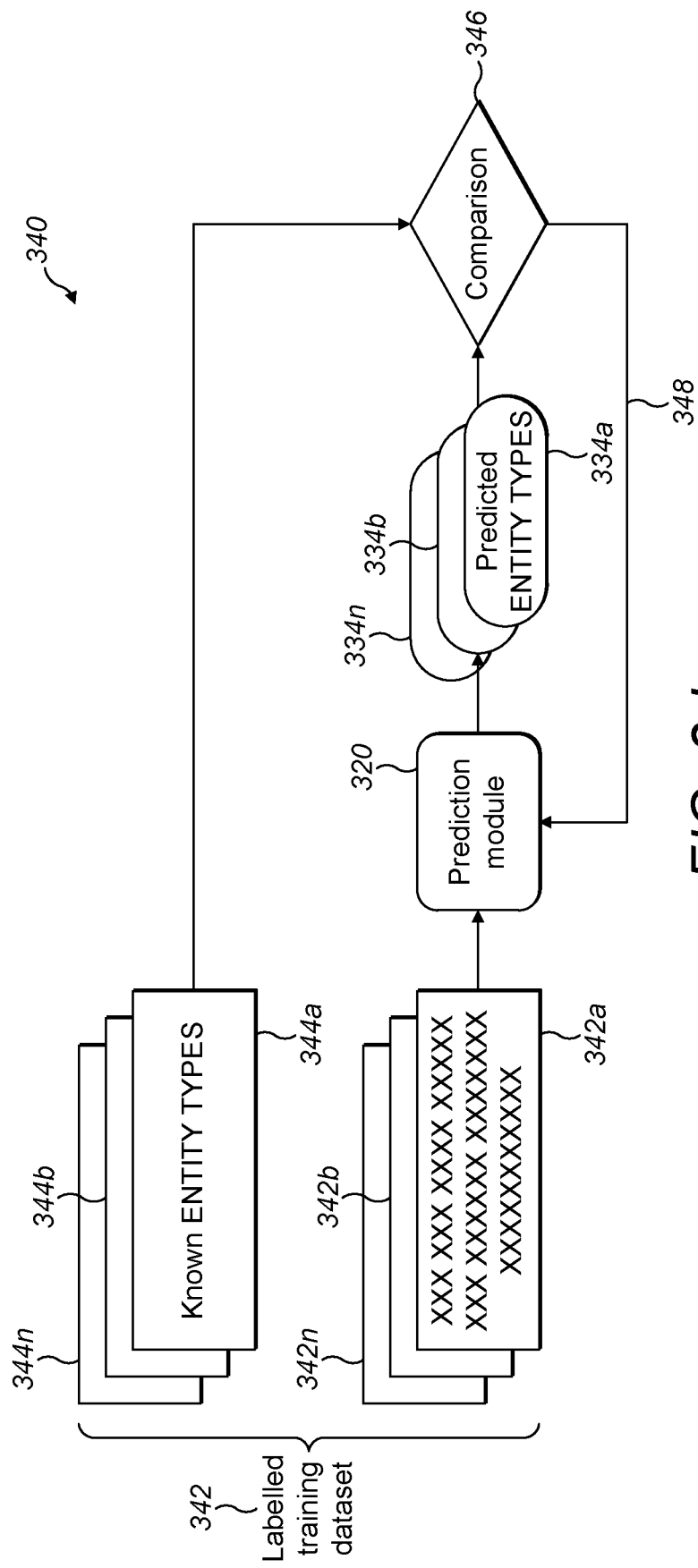
FIG. 3d is a flow diagram illustrating a process for training an ET-ML model of any of FIGS. 3a to 3c for an ET identification system according to the invention.

FIG. 3d is a flow diagram illustrating a training process 340 for training the ET model 320 of FIG. 3c according to the invention. As described with respect to FIG. 3c, a labelled training dataset X 342 may be used to train the ET ML model 320 for predicting the entity type of an identified entity. The ET ML model 320 may be trained by supplying the ET ML model 320 with a labelled training dataset X 342 comprising a plurality of text portions 342a-342n, each of the text portions 342a-342b surrounding a known entity of a plurality of entities, where each of the known entities have a corresponding known entity type 344a-344n. The set of text portions 342a-342n surrounding the known entities from the labelled training dataset X 342 is input to the ET ML model 320, which is configured to predict a set of entity types 334a-334n for each of the text portions 342a-342n. The predicted entity types 334a-334n are compared 346 with the known entity types 344a-344n in which the comparisons are fed-back 348 to the ET ML model 320 for updating the model parameters according to the ML technique used to generate the ET ML model 320.

In particular, the labelled training dataset X 342 may be based on a list of known pre-verified entity types 344a-344n is provided along with the text 342a-342n surrounding the entity names or known entities in their original documentation. This may be generated in advance by an NER system programmed to only return un-ambiguous entity names and entity types. Alternatively or additionally, the labelled training dataset X 342 may be initially manually curated. Each portion of text 344a-344n is supplied to the ET ML model 320, where a predicted entity type 334a-334n is output for every portion of text 344a-344n surrounding a known entity that is input. The ET ML model 320 only takes into account the portions of text 344a-344n surrounding the known entity, which excludes the text or character string representing the known entity. Comparisons are then made between the known (verified) entity types 344a-344n and the predicted entity types 334a-334n. The results of these comparisons are fed back 348 to the ET ML model 320 and can then be used to train the prediction system. For example, if the ET ML model 320 is based on a neural network, then the output of the comparison may be a loss function that is used for backpropagation through the neural network.

Figure 3E:
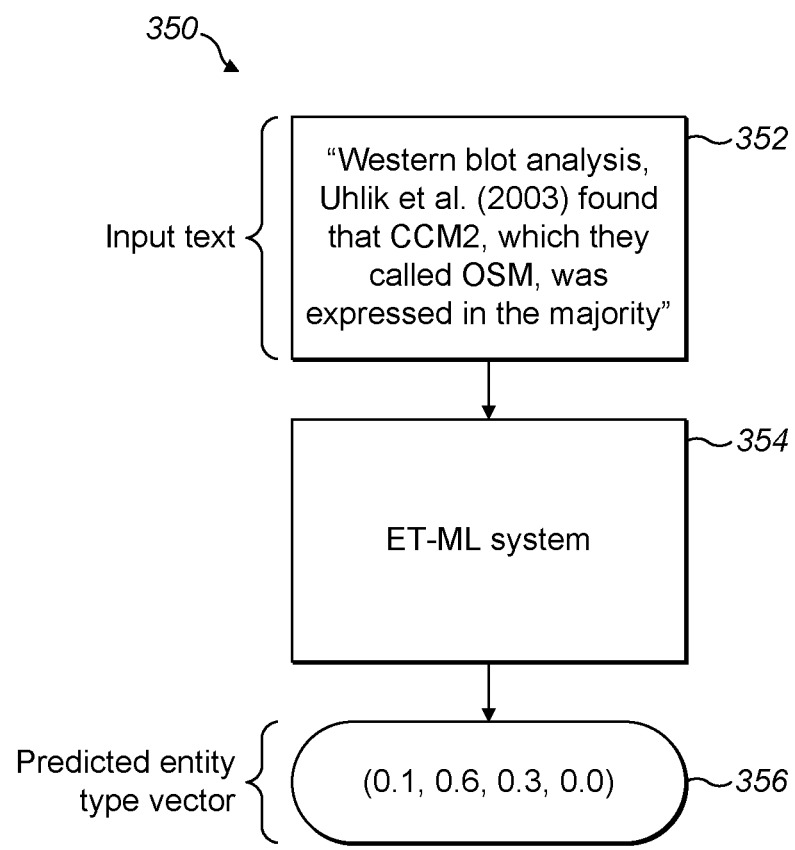
FIG. 3e is a schematic diagram illustrating an example of the ET-ML model of FIG. 3d when trained for an ET identification system according to the invention.

FIG. 3e is a schematic diagram illustrating an example input and output to an ET ML system 350 according to the invention using an ET model 354 based on any of the ET models described with reference to FIGS. 1a-3d. The ET ML system 350 includes an ET ML model 354 that, as described with reference to FIGS. 1a-3d, takes a portion of text 352 from a corpus of text as input, processes the portion of text 352 to output an entity type prediction vector 356. In this example, the input text portion 352 with an identified entity in bold includes the text: "Western blot analysis, Uhlik et. al. (2003) found that CCM2, which they called OSM, was expressed in the majority" in which the character string "CCM2" is the identified entity. The output prediction entity type vector 356 may be written as a row vector PE=(p1, p2, p3, p4), in which the values p1, p2, p3 and p4 represent the likelihood of the identified entity "CCM2" being one of four entity types Chemical, "Gene", "Disease" and "Other", respectively. In this case, p1 is the probability or likelihood that the identified entity is a "Chemical" entity type; p2 is the probability or likelihood that the identified entity is a "Gene" entity type; p3 is the probability or likelihood that the identified entity is a "Disease" entity type; and p4 is the probability or likelihood that the identified entity is a "Other" entity type.

In this example, the input text 352 to the ET ML Model 354 comprises several characters either side of a named or identified entity "CCM2", which may be an excerpt from a larger body of text supplied by an NER system. The text 352 is input into the ET ML model 356, and a prediction of the entity type is made to produce a prediction entity type vector 356. For example, the prediction entity type vector 356 is a vector of probabilities corresponding to the different entity types "Chemical", "Gene, Disease" or "Other". The probabilities may correspond to the entity types Chemical, "Gene", "Disease" or "Other", depending on the categories or entity types learned by the ET ML model 356 from a labelled training dataset 342. In this example, the given probabilities for these entity types are, respectively, 0.1, 0.6, 0.3, and 0.0, which means that the predicted entity type for identified entity "CCM2" is the entity type "Gene" as this has the highest probability or likelihood of 0.6. Essentially, the vector element with the highest value in the prediction entity type vector 356 indicates the entity type.

Figure 4:
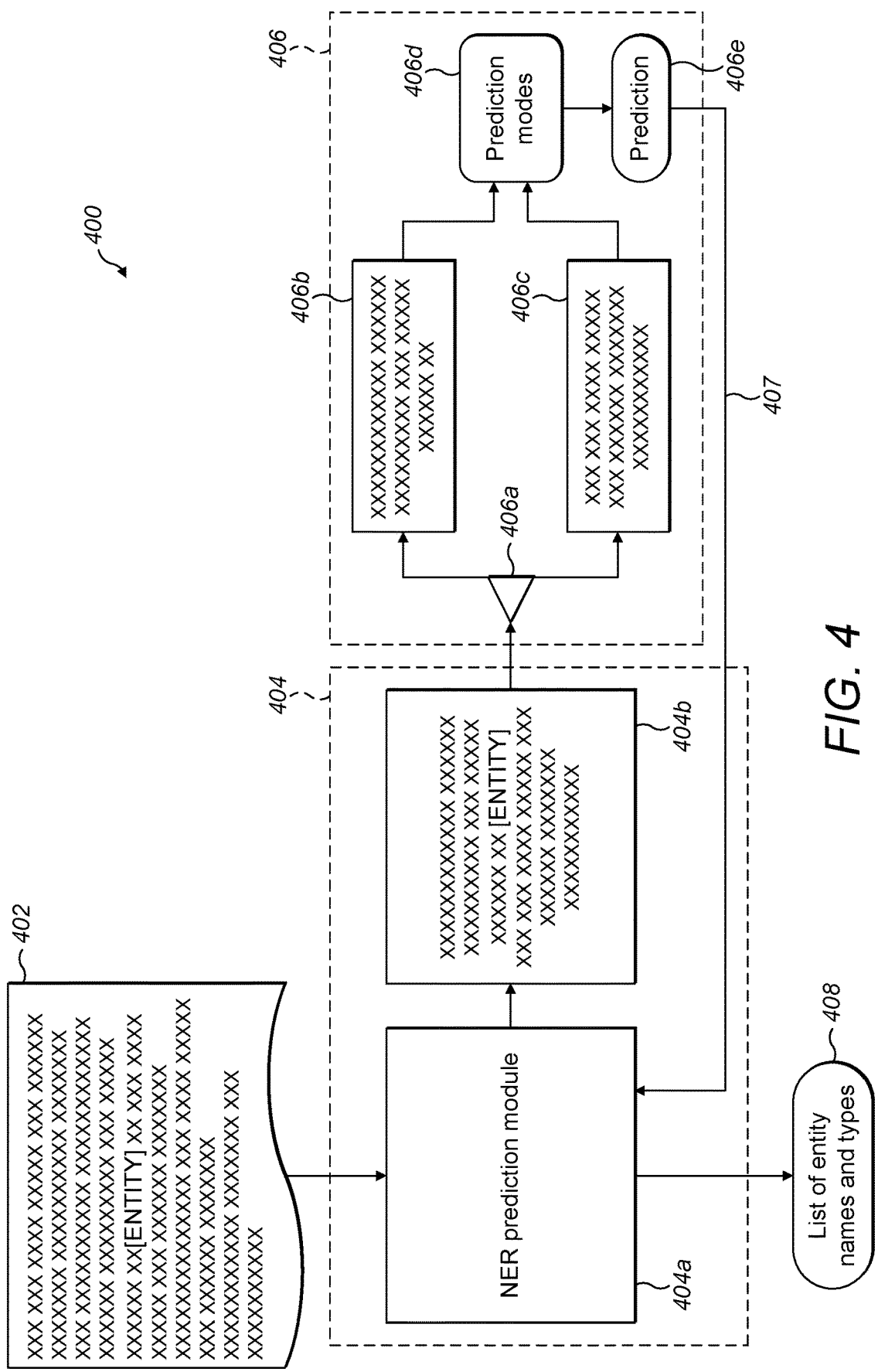
FIG. 4 is a schematic diagram illustrating another example ET identification system according to the invention based on the ET-ML models of FIGS. 3a-3e.

FIG. 4 is a schematic diagram illustrating another example ET identification system 400 according to the invention based on the ET-ML model(s) described with respect to FIGS. 3a-3e. The ET identification system 400 includes a document 402 from a corpus of text being input to an NER system 404, which includes an NER prediction module 404a and entity result 404b. The NER prediction module 404a outputs an entity result 404b based on the input text document 402. The entity result 404b includes data representative of a portion of text containing an identified entity (e.g. [ENTITY]) from the document 402 of the corpus of text. The entity result 404b may include data representative of the identified entity, the location of the character string of the identified entity, and an indication of the portion of text 404b surrounding the identified entity is selected from the document 402. In this example, the entity result includes a portion of text 404b that surrounds the identified entity (e.g. [ENTITY]) from the document 402 of the corpus of text. The entity result 404b may be input to an ET ML model 406, which in this case may be based on, by way of example only but is not limited to, ET ML model 320 of FIG. 3c and/or 3d. Although the ET ML model 406 is based on ET ML model 320 of FIG. 3c and/or 3d, it is to be appreciated by the skilled person that the ET ML model 406 may be based on, by way of example only but is not limited to, one or more ET model(s) as described with reference to FIGS. 1a to 3e and/or 5), modifications thereof, combinations thereof and the like. The ET ML model 406 includes a text splitter 406a which extracts the left portion of text 406b adjacent the identified entity (or a first portion of text before the identified entity) and the right portion of text 406c adjacent the identified entity (or a second portion of text after the identified entity), where both portions of text 406b and 406c do not include the identified entity. The left and right portions of text are input to a prediction module 406d, which may include one or more ET ML model(s) (not shown) based on, by way of example only but is not limited to, one or more ET model(s) as described with reference to FIGS. 1a to 3e and/or 5)), modifications thereof, combinations thereof and the like. The prediction module 406d outputs corresponding entity type vector embeddings that are combined to output an prediction entity type vector 406e that represents the likelihood or probability of the entity type. This is fed back to the NER system 404 for updating the entity type of the entity result 404b. The NER system 404 outputs a list of identified entities and corresponding entity types 408, which may have been updated using the identified entity type from ET ML model 406.

In another example, the input text 404b is provided by an NER system 404 operating on a document of text 402 to identify and extract entity names and entity types from within it. Where an entity type is ambiguous, the NER system 404 may provide the ET ML model 406 with the identified entity and the surrounding text 404b in order to perform disambiguation or to identify the most likely entity type of the identified entity in the text 404b. That is, as the NER system 404 processes the text document 402, when it encounters an entity of an ambiguous entity type or simply requires the entity type to be identified for an identified entity, the NER system 404 may extract text 404b surrounding the identified entity for input to ET ML model 406. The ET ML model 406 extracts from the input text 404b the text to the left 406b and text to the right 406c of the identified entity name (e.g. the size of the text to the left or the right may be a predefined number of: characters; words, sentences, and/or paragraphs, and the like, etc.), in which the identified entity name is discarded. These portions of text 404b and 404c are fed into a prediction module 406d, which includes one or more ET ML models trained and configured for predicting an entity type of an identified entity based on a portion of text surrounding the identified entity, but excluding the identified entity. Prediction of the entity type for the identified entity then takes place in the prediction module 406d in a similar manner as described, by way of example but not limited to, FIGS. 1a-3e. This results in a final prediction 406e of the entity type, which then fed back via path 407 into the NER system 404 for incorporation into the final output 408 of the NER system 404. The NER system 404 then delivers an output of the entity names and corresponding entity types contained within the input body of text 402.

Optionally, if the same ambiguous entity is encountered multiple times throughout a single document 402, the ET ML model may be configured to aggregate the predictions 406e for each instance of the identified entity in the text 402 together to form an overall prediction for the entity type for that identified entity. The presumption is that within a single document 402 a single identified entity name should always refer to the same entity type. This may be achieved by concatenating the individual prediction entity type vectors and using a normalisation function (e.g. softmax) to output a final document-level prediction entity type vector for the single identified entity.

Figure 5:
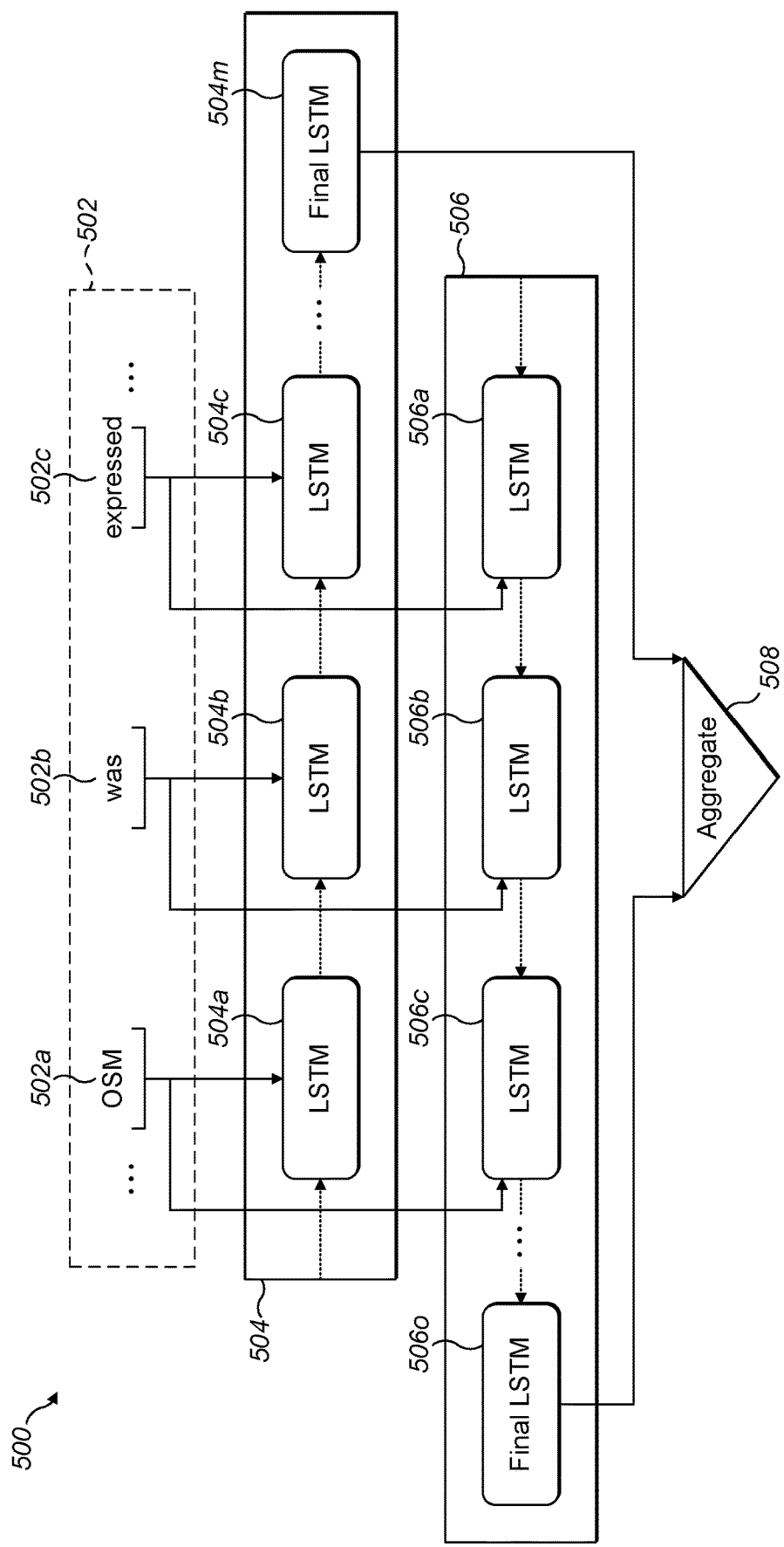
FIG. 5 is a schematic diagram illustrating the example ET-ML model based on bi-directional long short-term memory neural network for an ET identification system according to the invention.

FIG. 5 is a schematic diagram illustrating the example bi-directional LSTM neural network 500 as an example ET-ML model for an ET identification system according to the invention. Bi-directional LSTM neural network 500 may be used in ET-ML model 320 in which the ML modules 328a and 328b, which are shown operating on the left and right input text portions 326a and 326b in FIG. 3c, may consist of a bi-directional LSTM neural network 500. Referring to FIG. 5, the bi-directional LSTM neural network 500 operates on an input string of text that is split into words. In this example, the bi-directional LSTM neural network 500 is supplied with the left or right input text strings 502 that are divided into individual words. In this example, the text portion 352 of FIG. 3e is input in which only the words "OSM" 502a, "was" 502b and "expressed" 502c are shown, but it is assumed that all the words in the text portion 352 are input as left or right input text strings 502, excluding the entity name "CCM2". Each word of the text string 502 is passed to two LSTM systems 504 and 506 running concurrently. A first LSTM system 504 (e.g. a first portion of the ET-ML model, or first ET-ML model) operating in the forward direction of the input text string 502 and a second LSTM system 506 (e.g. a second portion of the ET-ML model, or second ET-ML model) operating in the reverse direction of the input text string 502.

The first LSTM system 504 includes at least one hidden layer that includes a plurality of LSTM cells 504a-504b, which are connected to each input word 502a-502c and the output of the adjacent previous LSTM cell 504a-504m. The second LSTM system 506 includes at least one hidden layer that includes a plurality of LSTM cells 506a-506o, which are connected to each input word 502a-502c and the output of an adjacent subsequent LSTM cell 506a-508o. Since LSTM systems have a 'memory' of previous Input values, the first LSTM system 504 (or forward LSTM system) provides an output for the final word in the text string 502 based on that word and all previous words in the text string 502, whereas the second LSTM system 506 (or reverse LSTM system) provides an output based on the first word in the text string 502 and every subsequent word in the text string 502. In this way, bias towards the last word in the string is removed, as one would expect from a single forward LSTM. The forward and reverse LSTMs 504 and 506 output prediction vectors from the last and first words of the final LSTM cells 504m and 506o in the text string 502 respectively. These predictions are then aggregated (for instance, by concatenation) together 508 in order to generate the prediction entity type vector embedding of the entity type as described, by way of example only but not limited to, with reference to FIGS. 3a-3e and 4.

The bi-directional LSTM neural network 500 is trained based on a labelled training dataset as described in relation to training ET ML models, by way of example only but not limited to, with reference to FIGS. 1a to 4. For example, a labelled training dataset may include a plurality of labelled training data instances in which each labelled training data instance includes data representative of a text portion associated with a known entity and labelled with a known entity type. The bi-directional LSTM neural network 500 receives each labelled training data instance as a input text string 502 that includes the text of the text portion surrounding the text corresponding to the known entity, but in which the input text string 502 does not include the text corresponding to the known entity. Thus, the bi-directional LSTM neural network 500 avoids overfitting an entity name with an entity type but rather learns how to recognise an entity type based on the context an entity appears within a portion of text.

The bi-directional LSTM neural network 500 combines the output of the first and second LSTM networks 504 and 506 (forward and backward LSTM networks) to generate a prediction entity type vector for each labelled training data instance. The bi-directional LSTM neural network 500 also performs comparisons between the known (verified) entity types of the labelled training data instances and the predicted entity type vectors that are output. The results of these comparisons are fed back to the bi-directional LSTM neural network 500 for updating the model parameters of the first and second LSTM networks and/or any other input/output embedding/encoding neural networks that may be used prior to inputting data representative of the input text string 502 to the first and second LSTM networks. The output of the comparison may be a loss function that is used for back-propagation through the one or more neural networks comprising the first and second LSTMs 504 and 506 and/or any other input/output embedding/encoding neural networks.

Figure 6A:
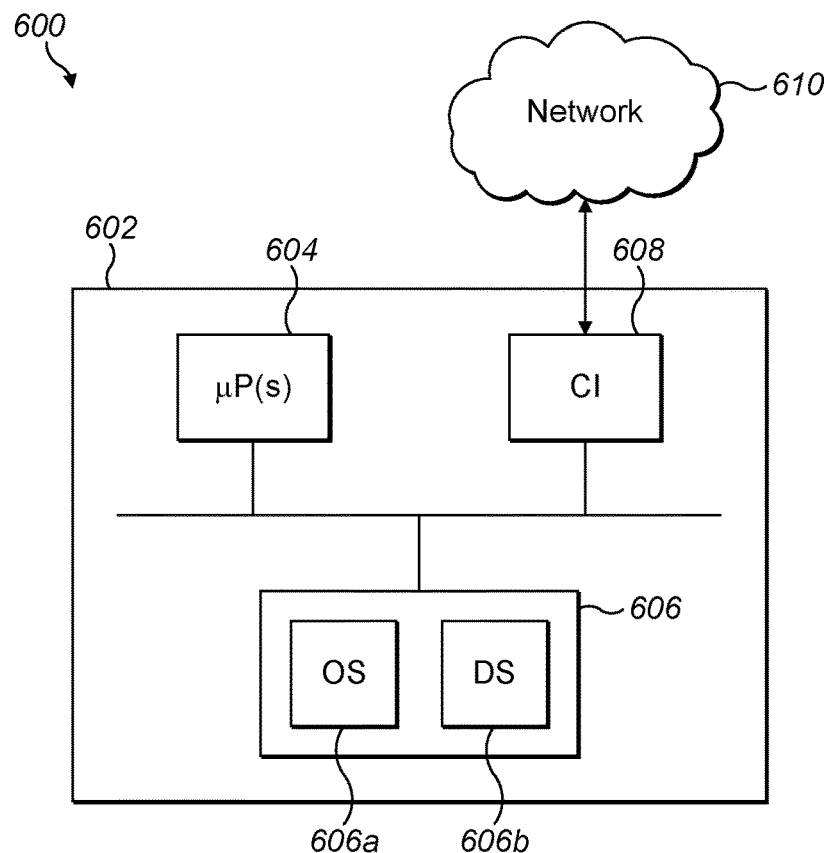
FIG. 6a is a schematic diagram illustrating a computing system/device according to the invention.

FIG. 6a is a schematic diagram illustrating an example computing system 600 with a computing device 602 may be used to implement one or more aspects of an ET identification system for processing a corpus of text to generate a set of entity results including data representative of an identified entity, a location of the identified entity in a portion of text of the corpus of text and/or the portion of text surrounding the identified entity and/or an ET ML model for processing the set of entity results to identify, predict and/or extract an entity type for each entity result according to the invention and/or based on the process(es), method(s), system(s), and/or apparatus as described with reference to FIGS. 1a-5. Computing device 602 includes one or more processor unit(s) 604, memory unit 606 and communication interface 608 in which the one or more processor unit(s) 604 are connected to the memory unit 606 and the communication interface 608. The communications interface 608 may connect the computing device 602, via a communication network 610, with one or more databases or other processing system(s) or computing device(s) for implementing the invention as described herein. The memory unit 606 may store one or more program instructions, code or components such as, by way of example only but not limited to, an operating system 606a for operating computing device 602 and a data store 606b for storing additional data and/or further program instructions, code and/or components associated with implementing the functionality and/or one or more function(s) or functionality associated with one or more of the method(s) and/or process(es) of the apparatus, mechanisms and/or system(s)/platforms/architectures as described herein and/or as described with reference to at least one of figure(s) 1a to 5.

Further aspects of the invention may include one or more apparatus and/or devices that include a communications interface, a memory unit, and a processor unit, the processor unit connected to the communications interface and the memory unit, wherein the processor unit, storage unit, communications interface are configured to perform or implement the system(s), apparatus, method(s) and/or process(es) or combinations thereof as described herein with reference to FIGS. 1a to 5.

Figure 6B:
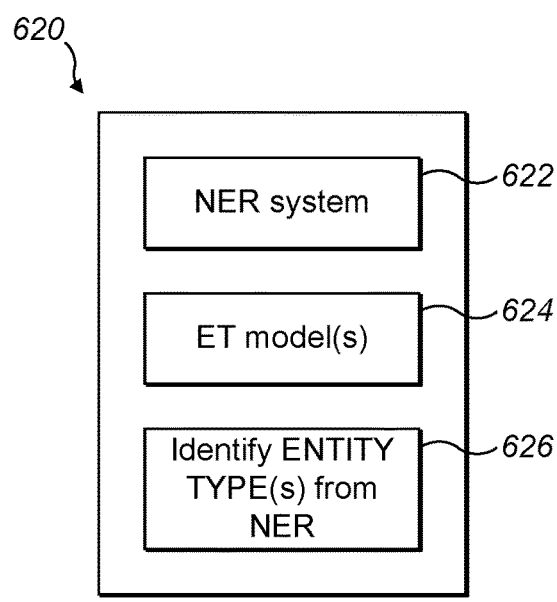
FIG. 6b is a schematic diagram illustrating a system according to the invention.

FIG. 6b is a schematic diagram illustrating a system 620 for performing ET identification on a set of entity results generated by an NER system 622 processing a corpus of text/documents to identify one or more entities according to the invention. The system 620 includes one or more NER system(s) 622, one or more ET ML Models 624, and an entity type results/identifying module/device 626. The NER system 622 may include, by way of example only but is not limited to, one or more NER entity-dictionary-based systems, one or more NER ML-based systems, modifications thereof, combinations thereof and/or as described herein, which may process a corpus of text to generate a set of entity results identifying one or more entities of interest, text portions from the corpus of text that surround the identified entities of interest, and/or positions of the entities of interest within the portions of text and the like. The ET ML Model(s) 624 may include, by way of example only but is not limited to, an ET model that is trained using an ML technique based on labelled training datasets that include for each known entity a portion of text surrounding the known entity and an known entity type label. The ML technique processes each portion of text excluding the known entity to generate, update and/or adapt model parameters of the ET ML Model(s) 624. Once trained, the ET ML model(s) 624 is configured to predict and/or identify an entity type of an identified entity based on a portion of text surrounding the identified entity but excluding the identified entity. The identified entity and/or portion text surrounding the identified entity may be suppled from a set of entity results output from an NER system 622. The entity type results/identification module/device 626 may include, by way of example only but is not limited to, an analysis/comparison mechanism for identifying entity types from the sets of entity type results output from the ET ML model(s) 624, where the identified entity types may be validated in an automated, semi-automated or manual fashion. The NER system(s) 622, ET ML model(s) 624, entity type results/identification module/device 626 may be configured according to the method(s), process(es), attention apparatus and/or system(s) associated with the invention, modifications thereof, and/or as described herein, and/or as described with reference to FIGS. 1a-6a for providing an efficient and improved accuracy in predicting/identifying entity types from identified entities in a corpus of text, which may be used generating suitable training datasets for training ET ML models, NER ML models, and/or training downstream ML processes, models, classifiers and the like.

In other aspects, an ET identification apparatus according to the invention may include one or more processor(s), a memory and/or a communication interface, the one or more processor(s) is connected to the memory and/or the communication interface, where the one or more processor(s) is configured to implement one or more of the process(es) 130, 140, 150 and 340 and/or one or more of the apparatus/systems/models 100, 110, 120, 200, 210, 300, 310, 320, 350, 400, 500, 600, and 610 and/or ET identification systems, ET ML model(s) or ET model(s), NER dictionary based systems, NER ML-based systems, classifier(s), and/or any method(s)/process(es), step(s) of these process(es), combinations thereof, modifications thereof, as described with reference to any one or more FIGS. 1a to 5b. Furthermore, the process(es) one or more of the process(es) 130, 140, 150 and 340 and/or one or more of the apparatus/systems/models 100, 110, 120, 200, 210, 300, 310, 320, 350, 400, 500, 600, and 610 and/or ET identification systems, ET ML model(s) or ET model(s), NER dictionary based systems, NER ML-based systems, classifier(s), and/or any method(s)/process(es), step(s) of these process(es), combinations thereof, modifications thereof, and/or as described with reference to any one or more FIGS. 1a to 6b may be implemented in hardware and/or software.

In the embodiment described above the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A computer-implemented method for entity type identification of entities within a corpus of text, the method comprising:

receiving one or more entity results, each entity result comprising data representative of an identified entity and a location of the identified entity within the corpus of text;

identifying an entity type for each entity of the received entity results by inputting text associated with the location of said each entity in the corpus of text to a trained entity type, ET, model configured for predicting or extracting the entity type of said each entity from the text associated with the location of said each entity; and outputting data representative of the identified entity type of each entity in the received entity results, wherein:

the text associated with the location of said each entity, that is input into the ET model, comprises text before and after the location of said each entity in the corpus of text but excludes the text or character string representing the entity;

the text before the location is embedded to produce a first entity type vector embedding representation;

the text after the location is embedded to produce a second entity type vector embedding representation;

the first entity type vector embedding representation and the second entity type vector embedding representation are combined to form an entity type prediction vector for the entity type of the identified entity;

the first entity type vector embedding representation is output by a first portion of the ET model which is configured and trained by a first machine learning, ML, technique;

the second entity type vector embedding representation is output by a second portion of the ET model which is configured and trained by a second ML technique, wherein the first ML technique and the second ML technique are different ML techniques; and the ET model outputs an entity type prediction based on the entity-embedding type prediction vector.

2. The computer-implemented method as claimed in claim 1, wherein receiving the one or more entity results further comprises receiving the one or more entity results generated by a named entity recognition, NER, system.

3. The computer-implemented method as claimed in claim 1, wherein each entity result comprising data representative of an identified entity and a location of the identified entity within the corpus of text includes one or more of the group of:
- an identified entity and an indication of the location of the identified entity within the corpus of text;
- an identified entity and portions of text from the corpus of text surrounding the identified entity;
- an identified entity, a first portion of text before the location of the identified entity, and a second portion of text after the location of the identified entity;
- a portion of text surrounding the location of an identified entity; and
- a first portion of text before the location of an identified entity and a second portion of text after the location of an identified entity.

4. The computer-implemented method as claimed in claim 1 further comprising:
- receiving one or more entity results from an NER system, wherein each entity result includes data representative of an a first portion of text before the location of an identified entity, and a second portion of text after the location of the identified entity within the corpus of text;
- identifying an entity type for each entity of the received entity results by inputting the first and second portions of text associated with the identified entity in the corpus of text to the trained entity type, ET, model configured for predicting or extracting an entity type of said each entity from the corpus of text; and
- sending data representative of the identified entity type of each entity in the received entity results to the NER system.

5. The computer-implemented method as claimed in claim 1 further comprising:
- receiving one or more entity results from an NER system, wherein each entity result includes data representative of an identified entity, an identified entity type and a location of the identified entity within the corpus of text;
- identifying ambiguous entity types between multiple entity results associated with related portions of text when said multiple entity results represent the same entity in which at least one of the multiple entity results has a different entity type as the other of the multiple entity results;
- inputting, for each of the multiple entity results, text associated with the location of said each entity in the corpus of text to the trained ET model configured for predicting or extracting an entity type of said each entity from the corpus of text; and
- aggregating the predicted or extracted entity types of the multiple entity results associated with the related portions of text for outputting an entity type representative of the multiple entity results.

6. The computer-implemented method as claimed in claim 5, wherein the related portions of text are located in a document from the corpus of text, and aggregating the predicted or extracted entity types of the multiple entity results for the document comprises aggregating the predictions for each entity of the multiple entity results to form an overall prediction for the entity type of the entities of the multiple entity results.

7. The computer-implemented method as claimed in claim 1 further comprising generating or updating the ET model by training the first and second ML techniques for predicting or extracting entity types from the corpus of text based on the one or more entity results.

8. The computer-implemented method as claimed in claim 7, wherein the first and second ML techniques comprise at least one ML technique selected from the group consisting of:
- a neural network;
- a recurrent neural network;
- a feed-forward neural network;
- a convolutional neural network;
- a long short-term memory, LSTM, neural network;
- a bi-directional LSTM neural network;
- a neural network based on LSTM conditional random field, CRF; and
- any other ML technique for predicting entity types from a corpus of text based on the one or more entity results.

9. The computer-implemented method as claimed in claim 7, further comprising updating the ET model based on the identified entity types.

10. The computer-implemented method as claimed in claim 9, further comprising training the first or second ML technique to generate or update the ET model based on a labelled dataset, the labelled dataset comprising a plurality of labelled data items, in which each labelled data item comprises a portion of text from the corpus of text associated with an entity and annotated with an entity type label.

11. The computer-implemented method as claimed in claim 10, wherein the portion of text from the corpus of text associated with an entity includes a first portion of text, a second portion of text representing the entity, and a third portion of text after the entity, wherein the first portion of text comprises the text before the location of the entity and the third portion of text comprises the text after the location of the entity.

12. The computer-implemented method as claimed in claim 11, wherein each labelled data item comprises the first and third portions of text surrounding the second portion of text representing the entity.

13. The computer-implemented method as claimed in claim 10, wherein training the first or second ML technique to generate or update the ET model further comprises iteratively training the first or second ML technique to generate or update the ET model based on the labelled dataset, by, for each iteration:
- comparing the labelled data items and the corresponding predicted or extracted entity types output from the ET model; and
- updating the ET model based on the comparisons based on a loss function associated with the first or second ML technique.

14. The computer-implemented method as claimed in claim 1, the ET model further comprising a first portion of the ET model and a second portion of the ET model, the first and second portions of the ET model configured to predict or extract data representative of entity types from the corpus of text based on the one or more entity results, the method further comprising:

splitting a portion of text associated with an entity of an entity result into a first portion of text before the location of said entity, and a second portion of text after the location of said entity;

inputting the first portion of text to the first portion of the ET model for predicting data representative of a first entity type estimate;

inputting the second portion of text to the second portion of the ET model for predicting data representative of a second entity type estimate; and combining data representative of the first and second entity type estimates to form an identified entity type associated with said entity.

15. The computer-implemented method as claimed in claim 14, wherein the data representative of the first entity type estimate comprises a first N-dimensional vector, and the data representative of the second entity type estimate comprises a second N-dimensional vector, wherein combining data representative of the first and second entity types further comprises concatenating the first and second N-dimensional vectors and reducing the dimensionality of the resulting vector to the number of possible entity types, wherein each vector element of the resulting vector corresponds to a different entity type, the value of each vector element representing the likelihood of the entity being that particular entity type.

16. The computer-implemented method as claimed in claim 1, wherein the ET model is generated from the first or second ML technique based on a bi-directional LSTM neural network.

17. The computer-implemented method as claimed in claim 1, wherein model parameters for the ET model are jointly trained based on a plurality of labelled data items, each labelled data item comprising data representative of a first portion of text before the location of an entity, a second portion of text after the location of the entity, and annotated with an entity type label associated with the entity.

18. An apparatus comprising:
a processor and a memory storing instructions that, when executed by the processor, cause the processor to execute a machine learning ML model, the processor configured to:
receive one or more entity results, each entity result comprising data representative of an identified entity and a location of the identified entity within a corpus of text;
identify an entity type for each entity of the received entity results by inputting text associated with the location of said each entity in the corpus of text into a trained entity type, ET, model configured for predicting or extracting an entity type of said each entity from the text associated with the location of said each entity; and
output data representative of the predicted or identified entity type for each entity of the received entity results, wherein:
the text associated with the location of said each entity, that is input into the ET model, comprises text before and after the location of said each entity in the corpus of text but excludes the text or character representing the entity;
the text before the location is embedded to produce a first entity type vector embedding representation;
the text after the location is embedded to produce a second entity type vector embedding representation;
the first entity type vector embedding representation and the second entity type vector embedding representation are combined to form an entity type prediction vector for the entity type of the identified entity;
the first entity type vector embedding representation is output by a first portion of the ET model which is configured and trained by a first ML technique;
the second entity type vector embedding representation is output by a second portion of the ET model which is configured and trained by a second ML technique, wherein the first ML technique and the second ML techniques are different ML techniques; and
the ET model outputs an entity type prediction based on the entity embedding type prediction vector.

19. The apparatus of claim 18, further comprising a communication interface, connected to the processor.

20. A system comprising:
a named entity recognition, NER, system for generating entity results from a corpus of text, each entity result comprising data representative of an identified entity and the location of the identified entity within the corpus of text; and
an apparatus according to claim 18 coupled to the NER system, the apparatus configured for receiving one or more entity results from the NER system.

21. A non-transitory computer-readable medium comprising data or instruction code, which when executed on a processor, causes the processor to implement the computer-implemented method according to claim 1.

22. The computer-implemented method as claimed in claim 1, wherein the entity comprises entity data associated with an entity type from the group of: gene;
disease; compound/drug; protein; chemical, organ, biological; or any other entity type associated with bioinformatics or chem(o)informatics and the like.

23. The computer-implemented method as claimed in claim 1, wherein the first entity type vector embedding representation and the second entity type vector embedding representation are N-dimensional vectors of an N-dimensional vector space, where N>1.

24. The computer-implemented method as claimed in claim 1, wherein the first ML technique or the second ML technique is at least one of a supervised ML technique, a semi-supervised ML technique, an unsupervised ML technique, a linear ML technique, or a non-linear ML technique.

25. A computer-implemented method for entity type identification of entities within a corpus of text, the method comprising:
receiving one or more entity results, each entity result comprising data representative of an identified entity and a location of the identified entity within the corpus of text;
identifying an entity type for each entity of the received entity results by inputting text associated with the location of said each entity in the corpus of text to a trained entity type, ET, model configured for predicting or extracting an entity type of said each entity from the text associated with the location of said each entity, wherein the entity comprises entity data associated with the entity type from the group of: gene, disease, compound/drug, protein, chemical, organ, biological; and
outputting data representative of the identified entity type of each entity in the received entity results, wherein:
the ET model is based on a neural network comprising forward and backward hidden states configured for representing a first portion of text before the location of the entity and a second portion of text after the location of the entity;

the text associated with the location of said each entity, that is input into the ET model, comprises the first portion of text and the second portion of text but excludes the text or character string representing the entity;

the forward hidden states represent the first portion of text;

the backward hidden states represent the second portion of text;

the forward hidden states and the backward hidden states are combined to form an entity type prediction vector for the entity type of the identified entity;

the forward hidden states are output by a first portion of the ET model and the backward hidden states are output by a second portion of the ET model, wherein the first portion of the ET model and the second first portion of the ET model comprise a joint ML neural network; and the joint ML neural network outputs an entity type prediction based on the entity type prediction vector; and generating a labelled training data set based on the identified entities in the corpus of text, suitable for training a machine learning model to perform a drug discovery task.

* * * * *